United States Patent
Tian

(10) Patent No.: US 11,745,868 B2
(45) Date of Patent: *Sep. 5, 2023

(54) AMPHIBIOUS AERIAL VEHICLE

(71) Applicant: Shanghai Autoflight Co., Ltd., Kunshan (CN)

(72) Inventor: Yu Tian, Hong Kong (CN)

(73) Assignee: SHANGHAI AUTOFLIGHT CO., LTD., Jiangsu Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/751,422

(22) Filed: May 23, 2022

(65) Prior Publication Data

US 2022/0281595 A1 Sep. 8, 2022

Related U.S. Application Data

(60) Division of application No. 17/396,733, filed on Aug. 8, 2021, now Pat. No. 11,440,654, which is a (Continued)

(30) Foreign Application Priority Data

Aug. 7, 2020 (CN) .......................... 202021632737.2

(51) Int. Cl.
*B64C 37/02* (2006.01)
*B64C 39/02* (2023.01)
(Continued)

(52) U.S. Cl.
CPC ............ *B64C 37/02* (2013.01); *B64C 39/024* (2013.01); *B64D 27/24* (2013.01); *B63B 7/08* (2013.01);
(Continued)

(58) Field of Classification Search
CPC ... B64C 37/00; B64C 37/02; B64C 2201/126; B64C 35/005; B64C 35/008
(Continued)

(56) References Cited

U.S. PATENT DOCUMENTS 6,409,122 B1 * 6/2002 Nicolai ................. B64C 39/024
244/1 R
7,946,530 B1 * 5/2011 Talmage, Jr. ........... B64C 39/02
244/140
(Continued)

FOREIGN PATENT DOCUMENTS

CN 105711824 A * 6/2016 ............. A63H 23/14
CN 106005434 A * 10/2016 ............. B64C 27/52
(Continued)

*Primary Examiner* — Christopher P Ellis
(74) *Attorney, Agent, or Firm* — WPAT LAW, P.C.; Anthony King

(57) ABSTRACT

A UAV with vertical takeoff and landing (VTOL) function. having a plurality of lift propellers; a cabin engaged with a plurality of lift propellers; a water propulsion system engaged with the cabin to push the cabin in a forward direction when the cabin is at least partially immersed in water; at least one water inlet engaged with the water propulsion system; the cabin is a cargo hold or a passenger cabin. The UAV provided by the disclosure can realize vertical takeoff and landing in the water area, and fly, drive and navigate freely in the whole area.

11 Claims, 20 Drawing Sheets

Related U.S. Application Data continuation-in-part of application No. 16/281,020, filed on Feb. 20, 2019, now abandoned.

(51) Int. Cl.
    *B64D 27/24*           (2006.01)
    *B63B 7/08*            (2020.01)
    *B64U 10/13*           (2023.01)
    *B64U 10/25*           (2023.01)
    *B64U 30/10*           (2023.01)
    *B64U 30/20*           (2023.01)
    *B64U 50/19*           (2023.01)

(52) U.S. Cl.
    CPC .......... *B64C 2211/00* (2013.01); *B64U 10/13* (2023.01); *B64U 10/25* (2023.01); *B64U 30/10* (2023.01); *B64U 30/20* (2023.01); *B64U 50/19* (2023.01)

(58) Field of Classification Search
    USPC .......................................................... 244/50
    See application file for complete search history.

(56) References Cited

U.S. PATENT DOCUMENTS

| | | | |
|---|---|---|---|
| 10,065,738 B2* | 9/2018 | Palmer | F03D 1/04 |
| 11,066,145 B1* | 7/2021 | Brutoco | B64B 1/08 |
| 2011/0226174 A1* | 9/2011 | Parks | B60F 5/02 |
| | | | 114/313 |
| 2016/0114887 A1* | 4/2016 | Zhou | G06Q 20/367 |
| | | | 348/148 |
| 2019/0127056 A1* | 5/2019 | Weekes | B64C 39/12 |
| 2020/0031438 A1* | 1/2020 | Moses | B64C 25/54 |
| 2020/0277045 A1* | 9/2020 | Parks | B64C 29/0025 |
| 2021/0107652 A1* | 4/2021 | Velazquez | B64D 5/00 |
| 2021/0237834 A1* | 8/2021 | They | B64F 1/12 |
| 2021/0316854 A1* | 10/2021 | Tumuluru | B64C 35/008 |
| 2021/0362855 A1* | 11/2021 | Giurca | B64C 39/024 |
| 2021/0380235 A1* | 12/2021 | Livieratos | B64C 37/00 |
| 2021/0394900 A1* | 12/2021 | They | B60F 5/003 |

FOREIGN PATENT DOCUMENTS

| | | | | |
|---|---|---|---|---|
| CN | 106564349 A | * | 4/2017 | |
| CN | 106976367 A | * | 7/2017 | ............. B60F 5/02 |
| CN | 107097952 A | * | 8/2017 | ............. B64C 35/00 |
| CN | 107696811 A | * | 2/2018 | |
| CN | 107933914 A | * | 4/2018 | ............. B64C 27/52 |
| CN | 108725778 A | * | 11/2018 | ............. B64C 3/42 |
| CN | 109353500 A | * | 2/2019 | ............. B60F 5/003 |
| CN | 110154658 A | * | 8/2019 | ............. B60F 5/02 |
| CN | 110282129 A | * | 9/2019 | |
| CN | 110667838 A | * | 1/2020 | |
| CN | 112124583 A | * | 12/2020 | |
| CN | 112572702 A | * | 3/2021 | |
| CN | 112758314 A | * | 5/2021 | |
| CN | 113247250 A | * | 8/2021 | |
| CN | 113306354 A | * | 8/2021 | ............. B60F 5/02 |
| EP | 3798124 A1 | * | 3/2021 | |
| KR | 20130109986 A | * | 5/2011 | |
| KR | 102128678 B1 | * | 1/2019 | |
| KR | 102225588 B1 | * | 1/2019 | |
| KR | 102128677 B1 | * | 10/2020 | |
| WO | WO-2018047187 A1 | * | 3/2018 | ............. B64C 27/08 |
| WO | WO-2018122830 A1 | * | 7/2018 | ............. B64B 1/44 |
| WO | WO-2019084487 A1 | * | 5/2019 | ............. B64C 27/08 |

* cited by examiner

AMPHIBIOUS AERIAL VEHICLE

FIELD OF THE DISCLOSURE

The disclosure relates to UAV (unmanned aerial vehicle) technology, in particular to a UAV with amphibious function.

BACKGROUND OF THE DISCLOSURE

Most of the existing VTOL UAVs adopts the mode of takeoff and landing on land, which is greatly affected by the land environment, especially in remote areas, areas with dense water network and coastal island areas. Most of the existing seaplanes adopt the takeoff and landing mode of water taxiing, which requires a large water area and does not have the ability of water VTOL. The existing composite flying vehicles and amphibious vehicles are mostly road and air dual use or water and land dual use, but there is no triphibian composite UAV that can be used on land, in water and in the sky. The existing VTOL UAV takes off on land, but it cannot take off in water. The existing seaplanes use flight power as the waterborne power source, but there is no special power system for propulsion in the water area.

SUMMARY OF THE DISCLOSURE

The disclosure relates to a UAV with VTOL function, which is used to solve the problem that the UAV in the prior art cannot take off and land vertically in the water area, or cannot fly, drive and navigate in all areas.

The disclosure provides a UAV with VTOL function, comprising:

A plurality of lift propellers;

A cabin engaged with a plurality of lift propellers;

A water propulsion system engaged with the cabin to push the cabin in a forward direction when the cabin is at least partially immersed in water;

At least one water inlet engaged with the water propulsion system.

In an embodiment of the disclosure, the water propulsion system comprises a motor and a water propeller.

In an embodiment of the disclosure, the water propulsion system also comprises a cylinder, which is fixedly connected with the cabin, and provided with an open end and a blocking end, with the axis parallel to the longitudinal axis of the cabin, and the open end of the cylinder faces the rear of the UAV; the water inlet is positioned on the side wall of the cylinder;

The motor is positioned inside the cylinder, and the body of the motor is fixedly connected with the inner wall of the cylinder;

The water propeller is positioned inside the cylinder and close to the open end of the cylinder, and the water propeller is connected with the output shaft of the motor.

In an embodiment of the disclosure, the motor is an electric motor.

In an embodiment of the disclosure, the UAV also includes a rudder engaged with the water propulsion system, which enables the travel direction to be changed when the cabin is partially immersed in water.

In an embodiment of the disclosure, the rudder has a vertically arranged sheet structure, and the top and bottom ends of the sheet structure are hinged with the two parts opposite to the inner wall of the cylinder, respectively. The rudder is positioned downstream of the water propeller and can rotate around the hinge point with the cylinder to change the travel direction of the UAV in the water area.

In an embodiment of the disclosure, a plurality of lift propellers are arranged on the flight platform, and the cabin is detachably attached to the bottom surface of the flight platform.

In an embodiment of the disclosure, the UAV also includes a pair of main wings engaged with the flight platform.

In an embodiment of the disclosure, the UAV also includes a pair of parallel linear supports engaged with a pair of main wings.

In an embodiment of the disclosure, a plurality of lift propellers are arranged on a pair of parallel linear supports.

In an embodiment of the disclosure, the UAV also includes a floating device engaged with the cabin to allow the cabin to float on the water; wherein, when the cabin is separated from the flight platform, the cabin can navigate in water.

In an embodiment of the disclosure, the floating device comprises a long strip structure capable of inflation and deflation, with its length direction parallel to the longitudinal axis of the cabin, and there are two long strip structures, which are arranged on the left and right sides of the cabin along the width direction of the cabin, respectively; and/or, The floating device comprises a plurality of air bags that can be inflated and deflated, and a plurality of air bags are evenly arranged on the left and right sides of the cabin.

In an embodiment of the disclosure, the UAV also includes the first energy storage unit arranged in the cabin, and the first energy storage unit is configured to supply energy to the water propulsion system.

In an embodiment of the disclosure, the cabin or the flight platform has a disengagement mechanism which allows for selectively separating the cabin from the flight platform during operation.

In an embodiment of the disclosure, the UAV also includes a user control interface inside the cabin for passengers to manually control the water propulsion system, wherein the cabin is a passenger cabin.

In an embodiment of the disclosure, the UAV also includes the second energy storage unit arranged in the flight platform, and the flight platform is arranged to fly without being attached to the cabin.

In an embodiment of the disclosure, the cabin has at least one electric wheel, and the electric wheel is configured to move the cabin on the ground.

In an embodiment of the disclosure, the flight platform has at least one electric wheel, which is configured to move the flight platform on the ground without being attached to the cabin.

In an embodiment of the disclosure, the cabin is a cargo cabin or a passenger cabin.

The disclosure provides a UAV with vertical take-off and landing function, which comprises a plurality of lift propellers; a cabin engaged with a plurality of lift propellers; a water propulsion system engaged with the cabin to push the cabin in a forward direction when the cabin is at least partially immersed in water; at least one water inlet engaged with the water propulsion system; wherein, the cabin is a cargo hold or a passenger cabin. The UAV with VTOL function provided by the disclosure realizes the purpose of UAV navigation in the water area by installing a water propeller at the rear of the manned cargo hold, completes the mode of VTOL in the water area by means of the VTOL system, and realizes the purpose of VTOL in the water area. It can realize the triphibian composite application function of the UAV by installing the water propeller at the rear of the manned cabin and installing the landing gear electric taxi wheel in the manned cabin. The modes of dual regions, such as water and land, road and air, water and air, may also be changed freely to realize the flight, driving and navigation capacity in all regions. The purpose of UAV navigation in the water may be realized through the water propeller installed at the rear of UAV manned cabin.

Although the specifications contain many details of specific implementations, they should not be interpreted as limitations on any disclosure or the scope of protection that can be claimed, but as a description of the characteristics of specific implementations for specific embodiments. Some characteristics described in the context of different implementations in the specifications may also be combined in separate implementations. On the contrary, various characteristics described in the context of separate implementations may also be implemented in multiple implementations alone or in any suitable sub-combination. Further, although characteristics may be described as functioning in certain combinations and even initially in the context, in some cases, one or more characteristics from the described/claimed combination may be removed from the combination, and the described/claimed combination may be a sub-combination or a change to the sub-combination.

Many implementations have been described. However, it should be understood that various modifications may be made without departing from the spirit and scope of the disclosure. For example, the example operations, methods, or processes described herein may include more or less steps than those described. In addition, the steps in these example operations, methods, or processes may be performed in a different manner than those described or shown in the drawings.

Details of one or more implementations of the subject matter described in the disclosure are described in the drawings and the following description. Other characteristics, aspects and advantages of the subject matter will become apparent according to the specifications, drawings and technical solution.

BRIEF DESCRIPTION OF THE DRAWINGS

It should be noted that the drawings may be in a simplified form and may not be shown in an accurate scale. With reference to the disclosure herein, for convenience and clarity only, and with reference to the drawings, directional terms such as top, bottom, left, right, up, down, upward, above, downward, below, rear, front, distal and proximal are used. These directional terms should not be interpreted as limiting the scope of the embodiments in any way.

FIG. 1b is a partially enlarged view of the UAV system of FIG. 1a;

Figure 1A:
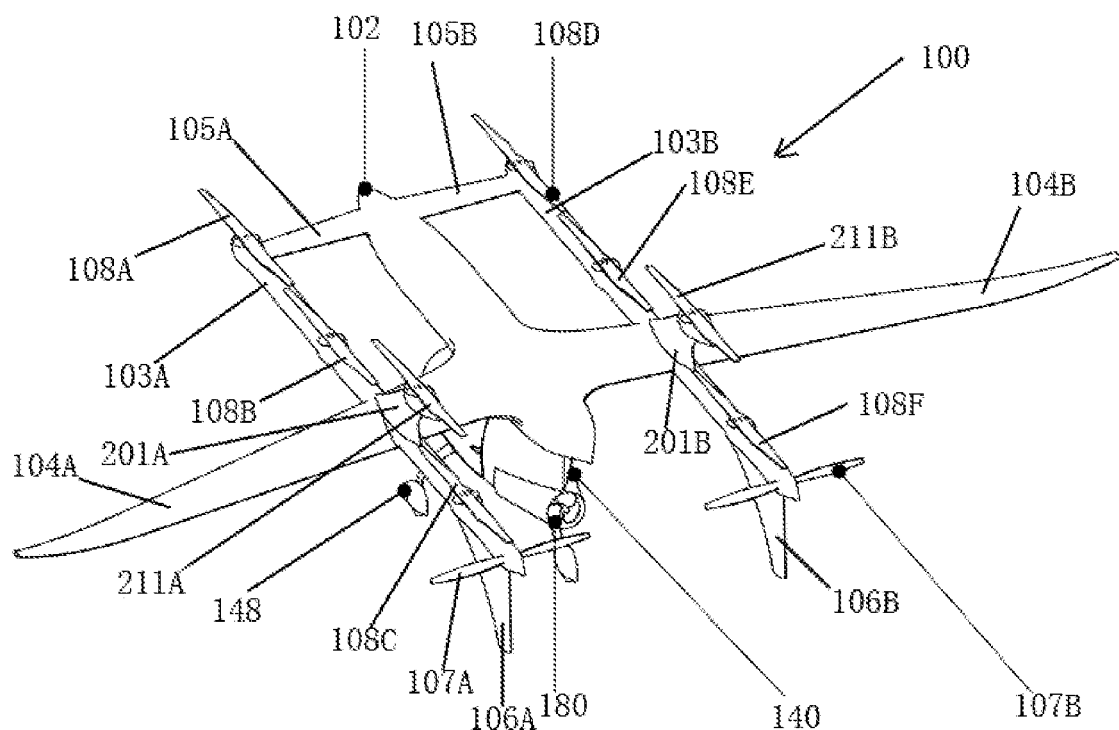
FIG. 1a is a top perspective view of an embodiment of a VTOL UAV system with a cabin and a water propulsion system according to one aspect of the embodiment.

When referring to the elements of the reference signs, in all the drawings of the specifications, the same components are represented by the same reference signs:

100—UAV; 101—Flight platform; 102—Main body; 103A—Left linear support; 103B—Right linear support; 104A—Left main wing; 104B—Right main wing; 105A—Left front wing; 105B—Right front wing; 106A—Left vertical stabilizer; 106B—Right vertical stabilizer; 107—Propulsion propeller; 107A—Left propulsion propeller; 107B—Right propulsion propeller; 108A—First lift propeller; 108B—Second lift propeller; 108C—Third lift propeller; 108D—Fourth lift propeller; 108E—Fifth lift propeller; 108F—Sixth lift propeller; 109A—Left wingtip propeller; 109B—Right wingtip propeller; 110A—Left wingtip vertical stabilizer; 110B-Right wingtip vertical stabilizer; 111A-Left folding leg; 111B—Right folding leg; 112A—First spring leaf; 112B—Second spring leaf; 112C—Third spring leaf; 112D—Fourth spring leaf; 116—Vertical extender; 117—Central propulsion propeller; 130—Cargo hold; 135a—First cabin spring leaf; 135B—Second cabin spring leaf; 135C—Third cabin spring leaf; 135D—Fourth cabin spring leaf; 140—Passenger cabin; 145A—Cabin leg; 145B—Cabin leg; 145C—Cabin leg; 145D—Cabin leg; 147—Cabin attachment latch; 148—Electric wheel; 149—Housing; 150—Energy storage unit in the flight platform; 155—In-cabin energy storage unit; 160—Floating device; 170—Water propulsion system; 180—Water propeller; 190—Water inlet; 200—Electric wheel steering device; 201A—Left dorsal fin; 201B—Right dorsal fin; 211A—Left additional lift propeller; 211B—Right additional lift propeller; 212—Aileron.

DESCRIPTION OF THE PREFERRED EMBODIMENTS

Now, by turning to the detailed description of the following embodiments, we may better understand different aspects of various embodiments, which are presented as illustrative examples of the embodiments defined in the technical solution of the specifications. It is clearly understood that the embodiments defined by the technical solution of the specifications may be wider than the illustrated embodiments described below.

The terms used to describe various embodiments in the specifications shall be understood as not only having the meaning of their common definitions, but also including special definitions in the structure, material or behavior in the specifications that are beyond the meaning of the usual definitions. Therefore, if an element can be understood to include more than one meaning in the context of the specifications, its use in the technical solution of the specifications must be understood to be common to all possible meanings supported by the specifications and the terms themselves.

The term "UAV" is defined as a flight transportation system with at least one propeller as a propulsion source. The term "UAV" may include "manned" and "unmanned" flight transport systems. Manned UAV may refer to a flight transportation system, which carries human passengers who have no control over UAV. Manned UAV may also refer to a flight transportation system that carries human passengers, some or one of which have or has some control over the UAV.

For example, in the background of the disclosure, the existing VTOL UAV has the problem that it cannot take off and land vertically in the water area or cannot fly, drive and navigate in all areas. In order to solve the above problems, the disclosure provides a UAV with VTOL function, comprising: a plurality of lifting propellers; a cabin engaged with a plurality of lift propellers; a water propulsion system engaged with the cabin to push the cabin in a forward direction when the cabin is at least partially immersed in water; at least one water inlet engaged with the water propulsion system; among them, the cabin is cargo hold or passenger cabin.

The technical solution of the disclosure is described in detail below in combination with the specific drawings.

Figure 1B:
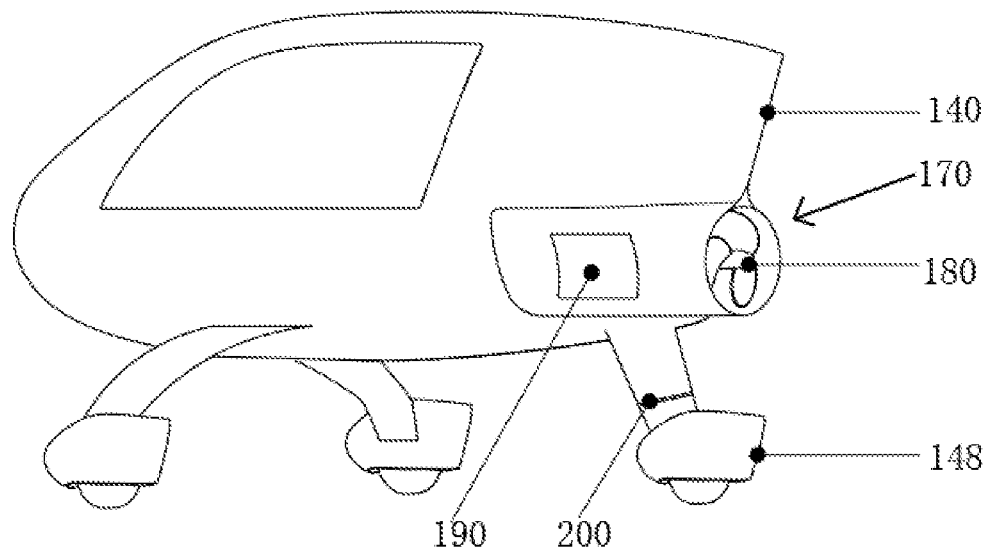
Figure 1C:
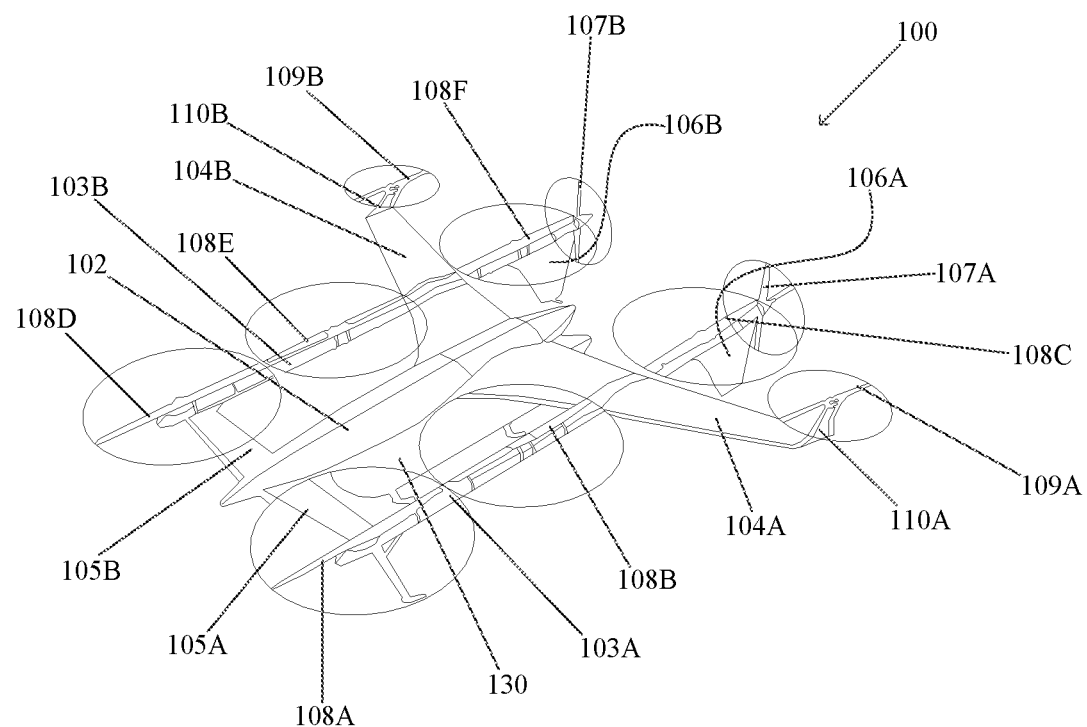
FIG. 1c is a top perspective view of an embodiment of a VTOL UAV system with a flight platform and a cabin according to one aspect of the embodiment.
Figure 2:
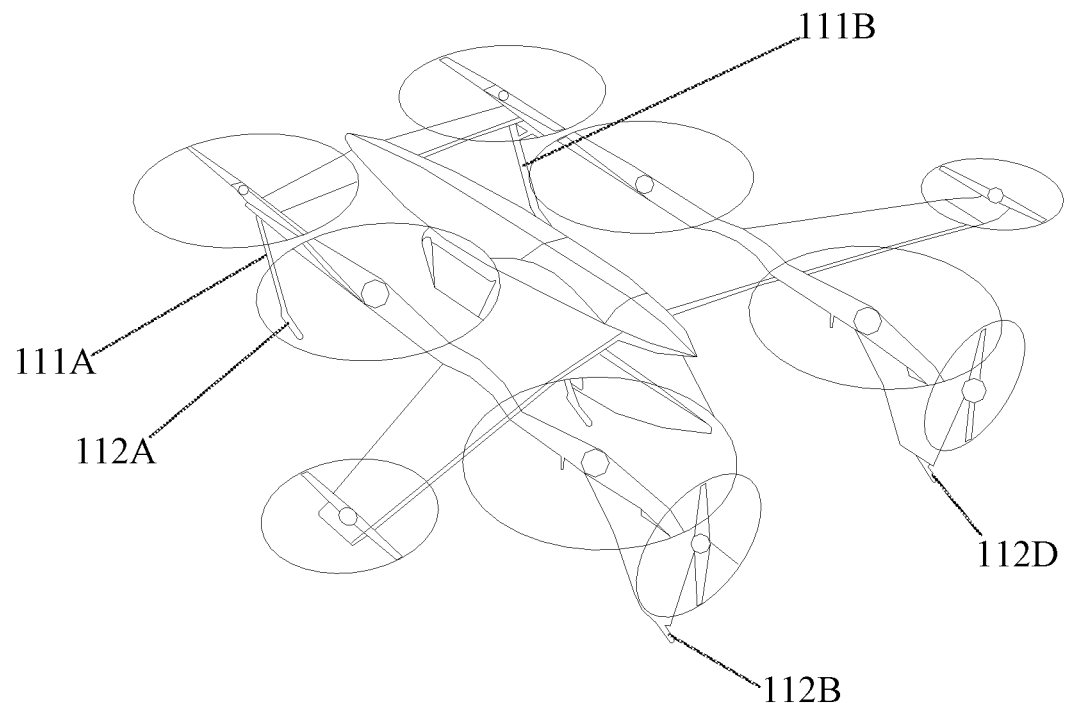
FIG. 2 is a top rear perspective view of the UAV system of FIG. 1c.
Figure 3:
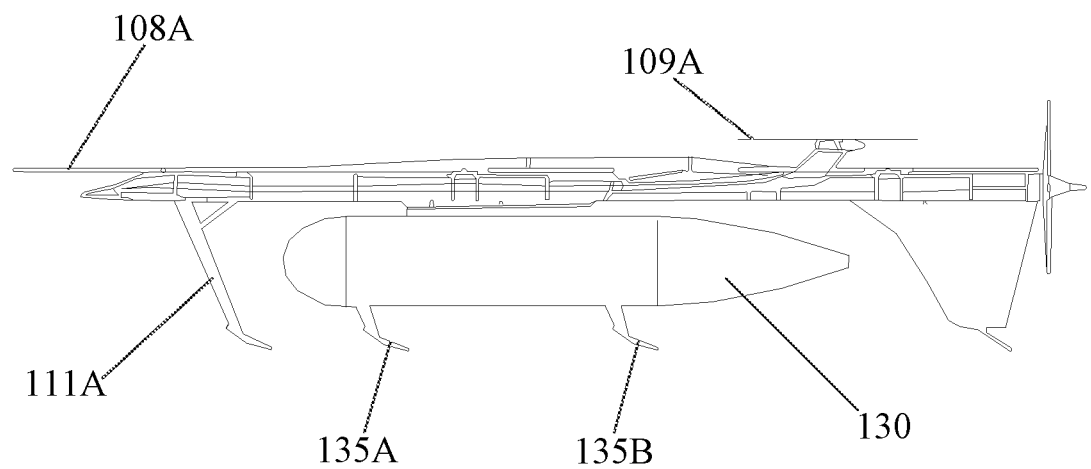
FIG. 3 is a side view of the UAV system of FIG. 1c.
Figure 4:
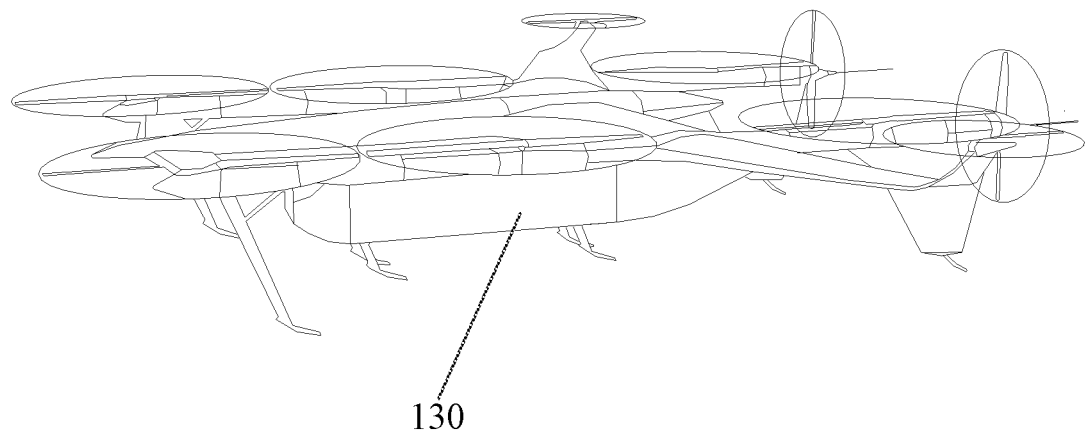
FIG. 4 is a top perspective view of another embodiment of a VTOL UAV system with a flight platform and a detachable attached cabin according to one aspect of the embodiment.
Figure 5:
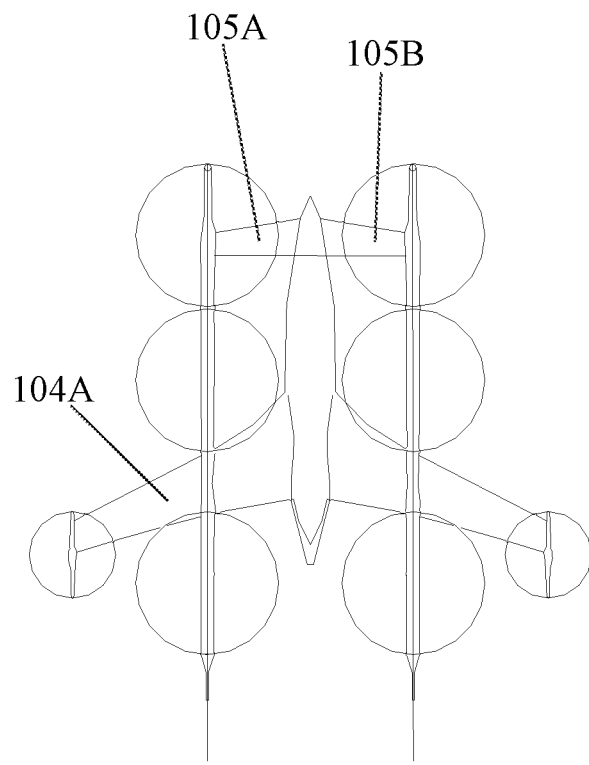
FIG. 5 is a top view of the UAV system of FIG. 4 according to one aspect of the embodiment.
Figure 6:
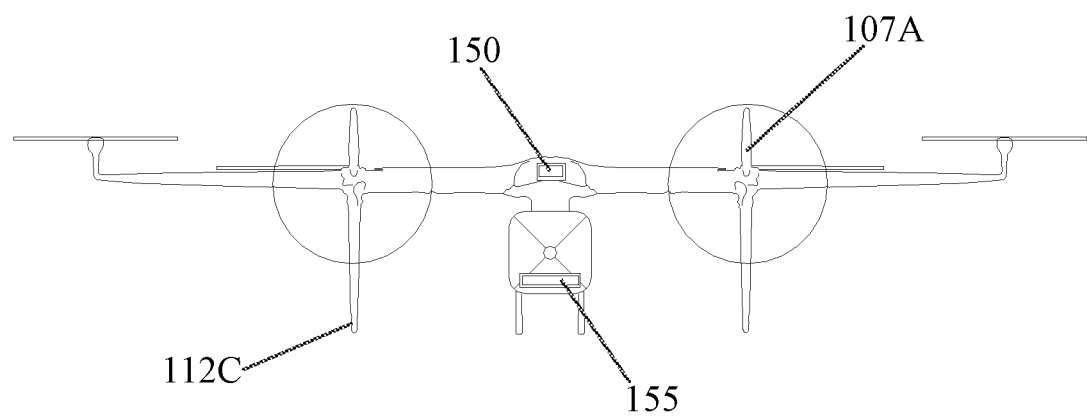
FIG. 6 is a front view of the UAV system of FIG. 4 according to one aspect of the embodiment.
Figure 7:
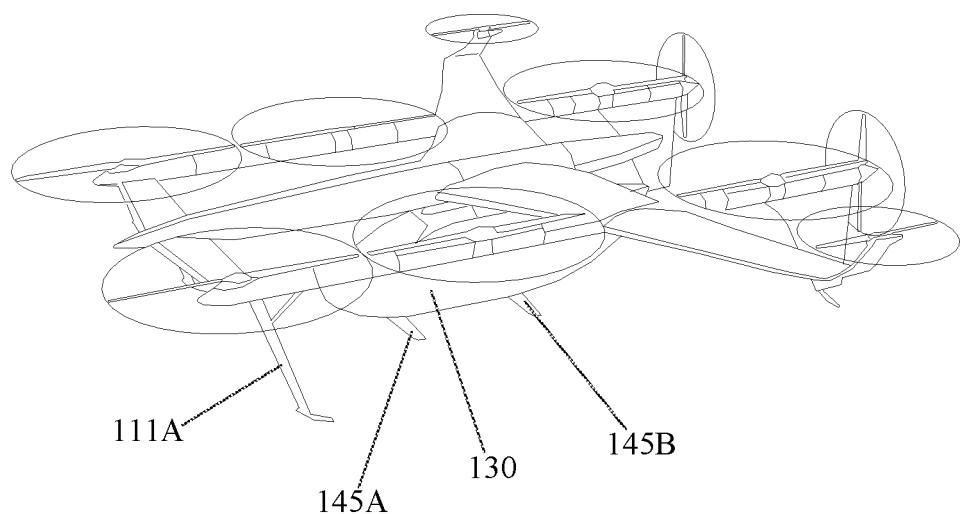
FIG. 7 is a top perspective view of the embodiment of a VTOL UAV system with a flight platform and a detachable attached cabin according to one aspect of the embodiment.
Figure 8:
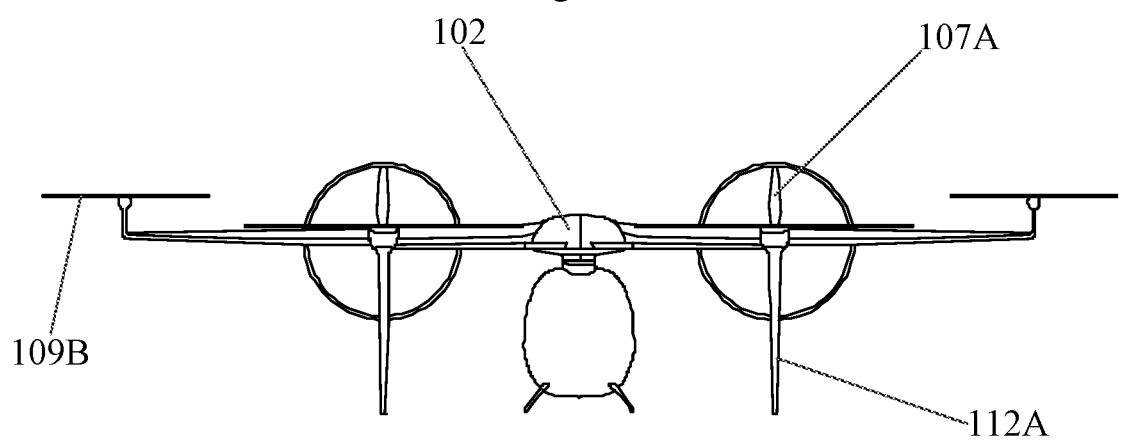
FIG. 8 is a front view of the UAV system of FIG. 7 according to one aspect of the embodiment.
Figure 9:
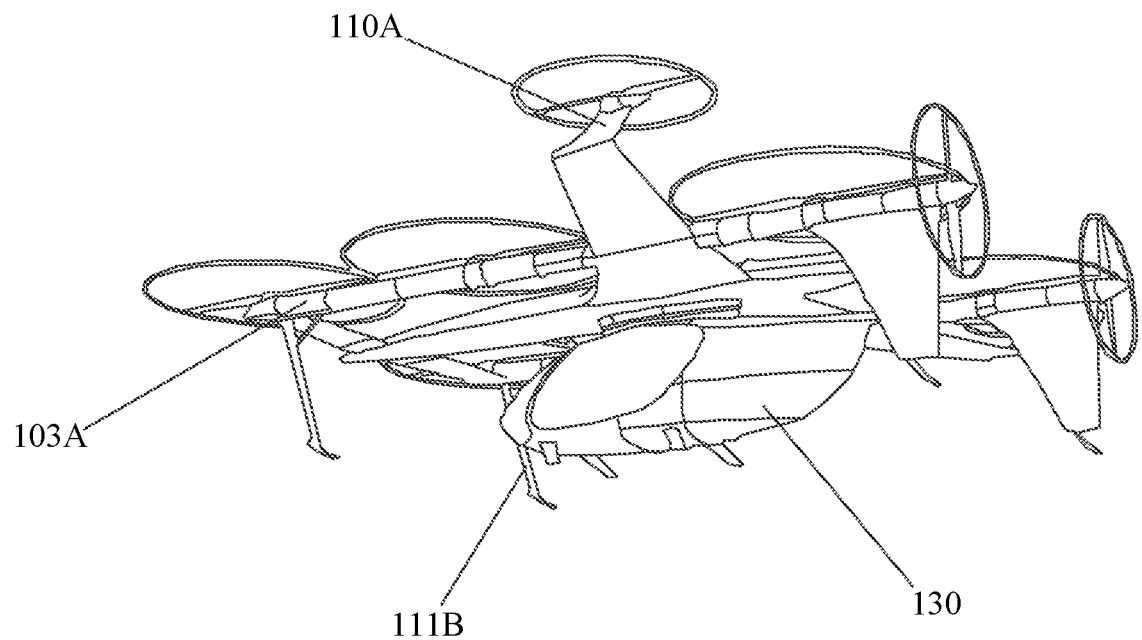
FIG. 9 is a rear perspective view of the UAV system of FIG. 7 according to one aspect of the embodiment.
Figure 10:
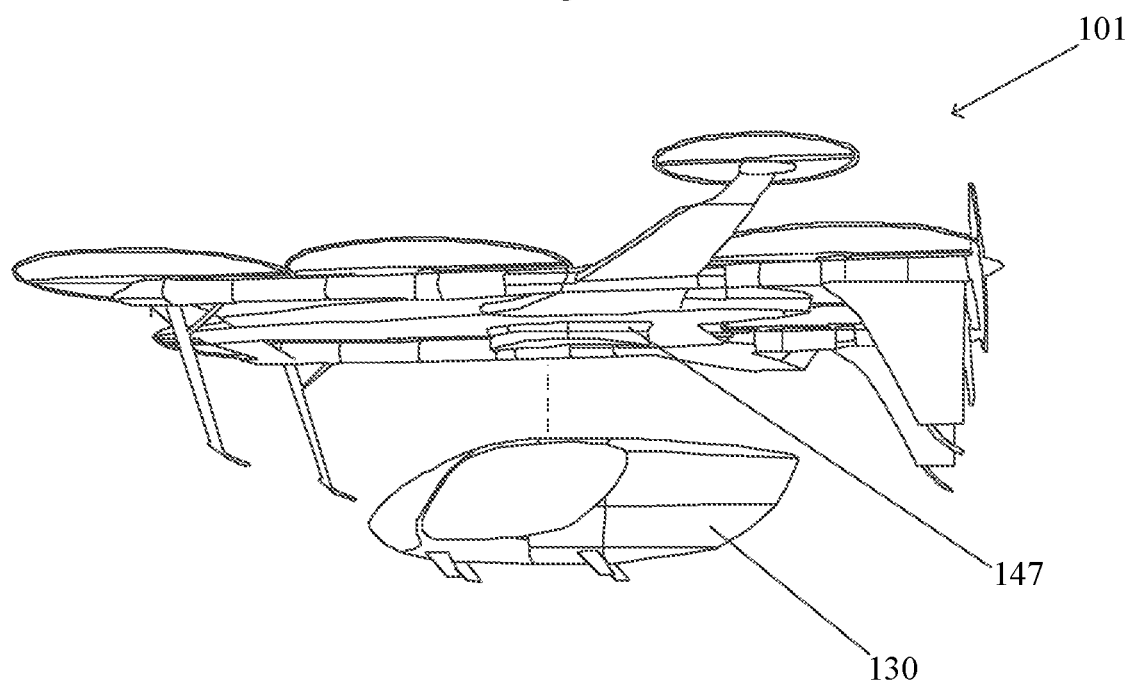
FIG. 10 is a side perspective view of the UAV system of FIG. 7 according to one aspect of the embodiment, wherein the cabin is separated from the flight platform and parked on the ground.
Figure 11:
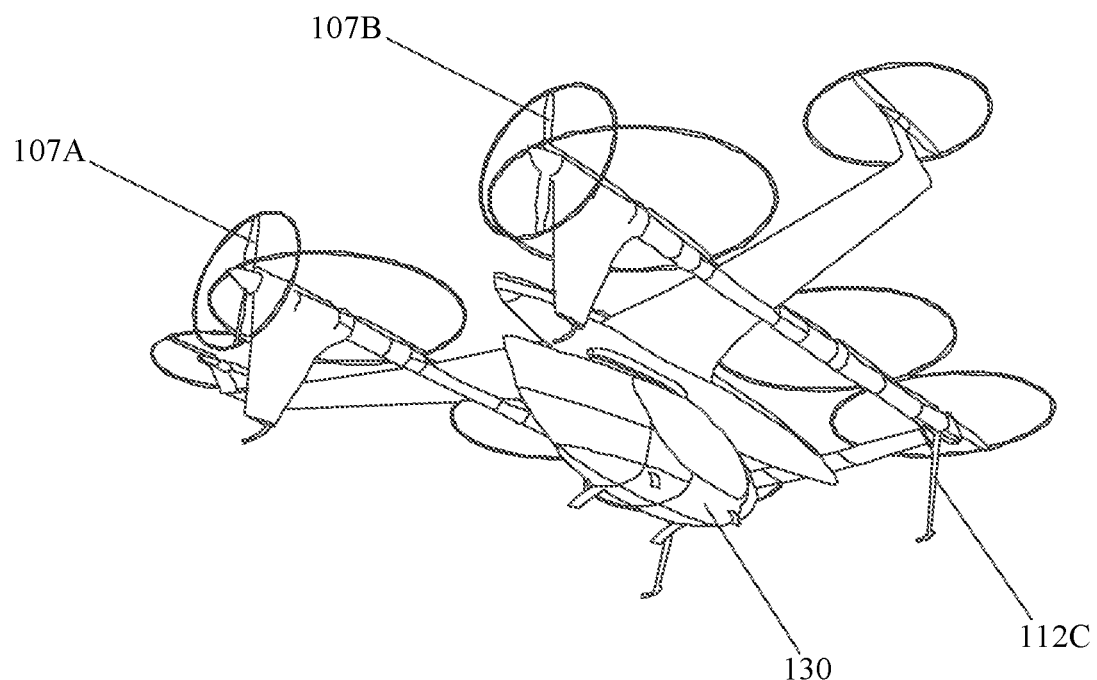
FIG. 11 is a rear perspective view of the embodiment of FIG. 7 according to one aspect of the embodiment.
Figure 12:
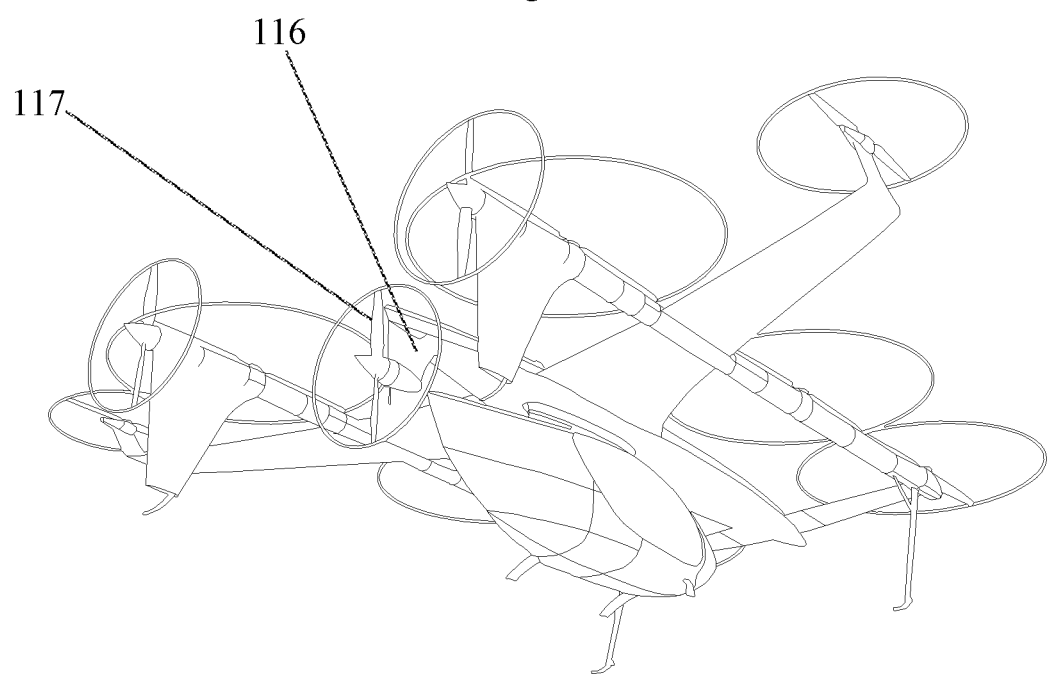
FIG. 12 is a rear perspective view of another embodiment according to one aspect of the disclosure.
Figure 13:
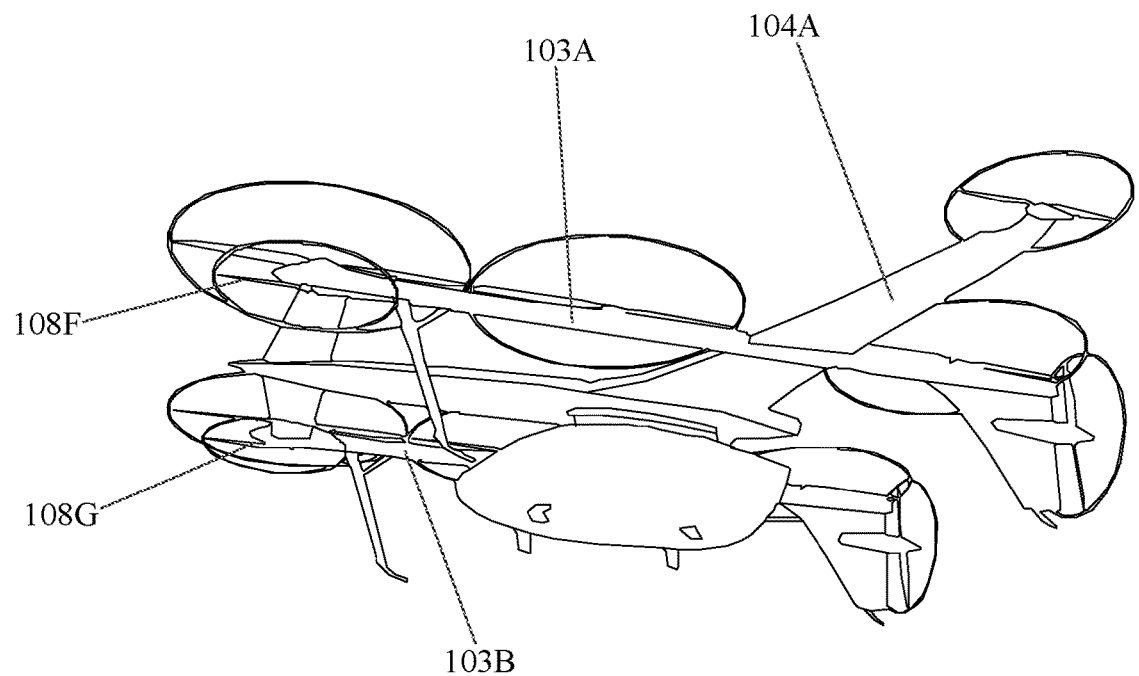
FIG. 13 is a side bottom perspective view of another embodiment of a UAV system according to one aspect of the embodiment.
Figure 14:
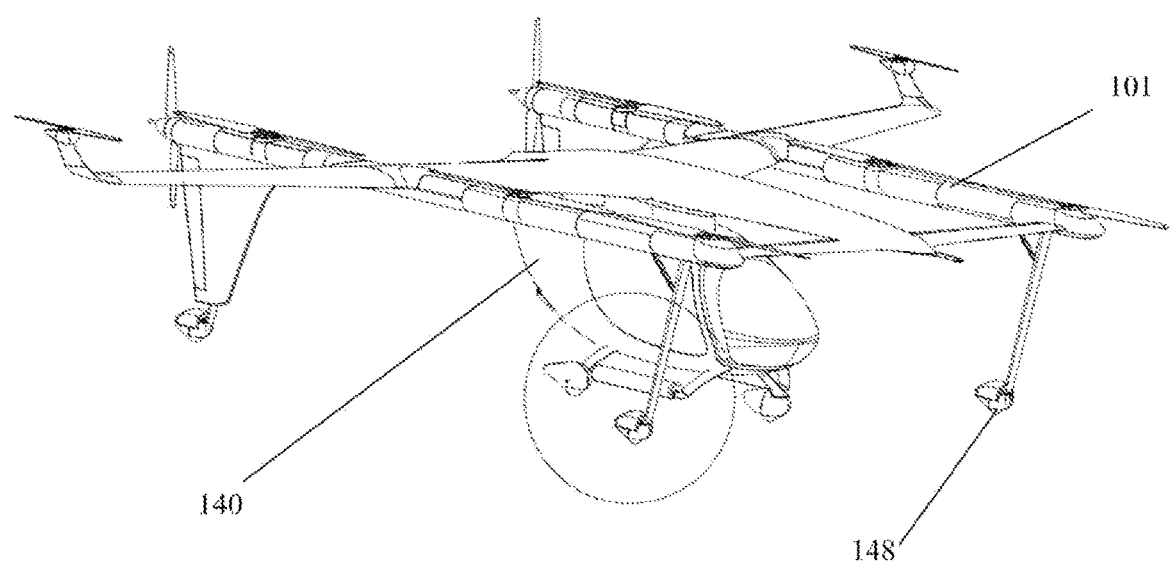
FIG. 14 is a perspective view of an embodiment of a UAV system according to another aspect of the embodiment.
Figure 15:
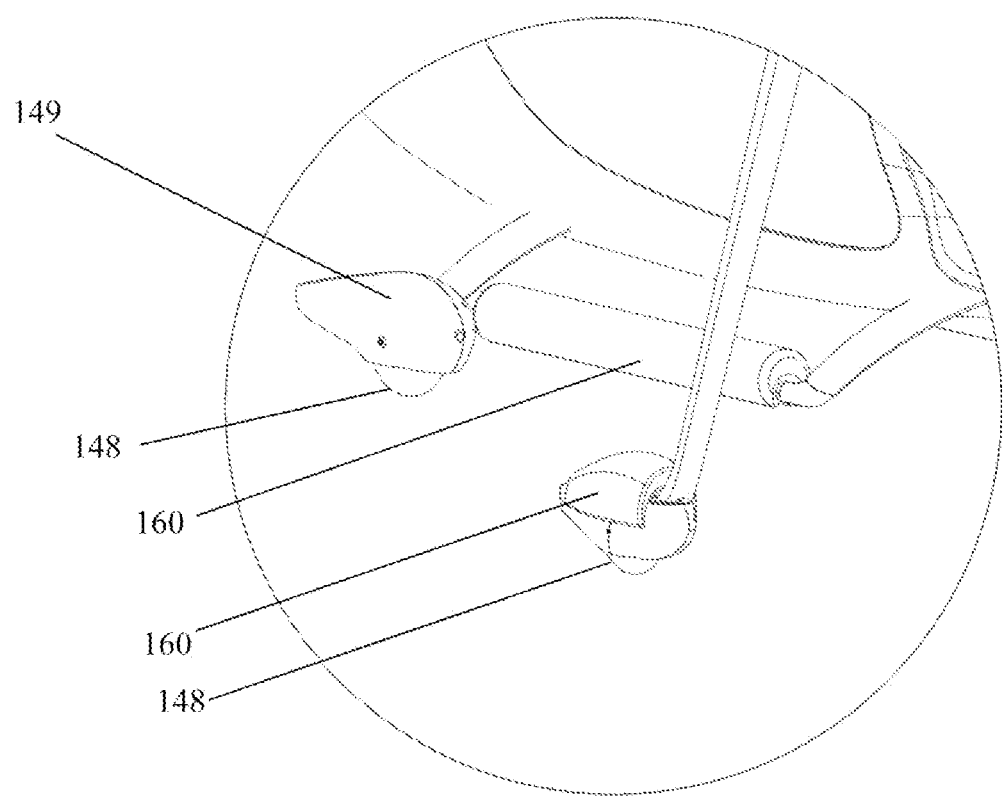
FIG. 15 is a close-up view of the surrounding area in FIG. 14 according to another aspect of the embodiment.
Figure 16:
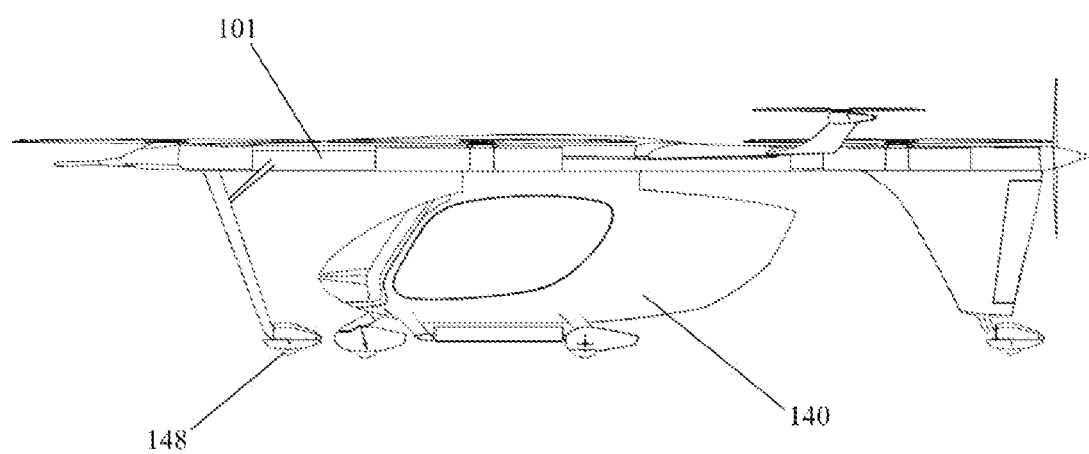
FIG. 16 is a side view of one embodiment of a UAV system according to another aspect of the embodiment.
Figure 17:
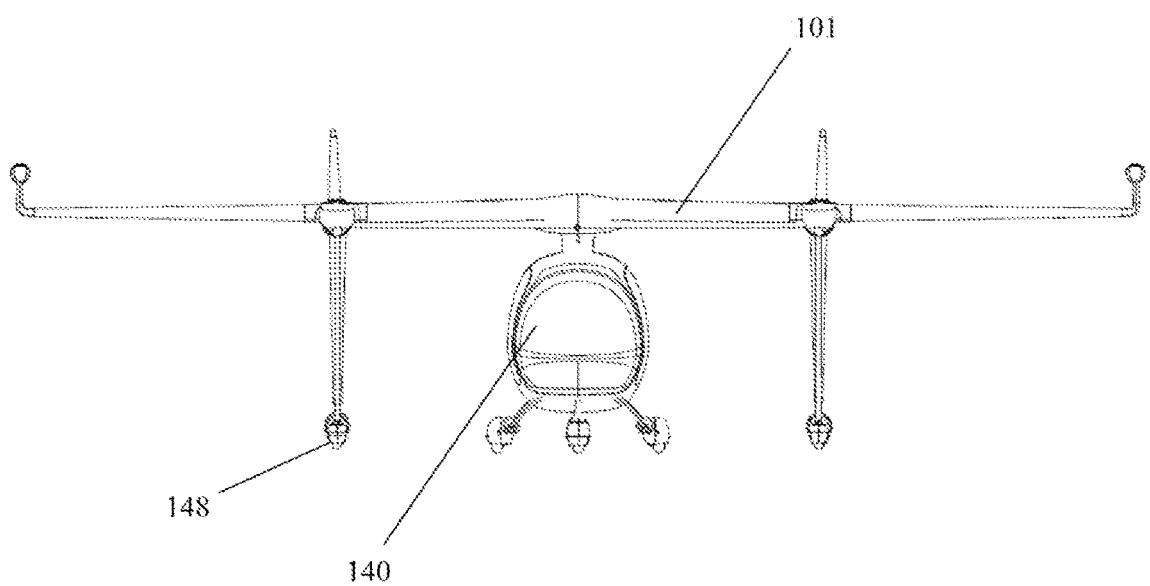
FIG. 17 is a front view of one embodiment of a UAV system according to another aspect of the embodiment.
Figure 18:
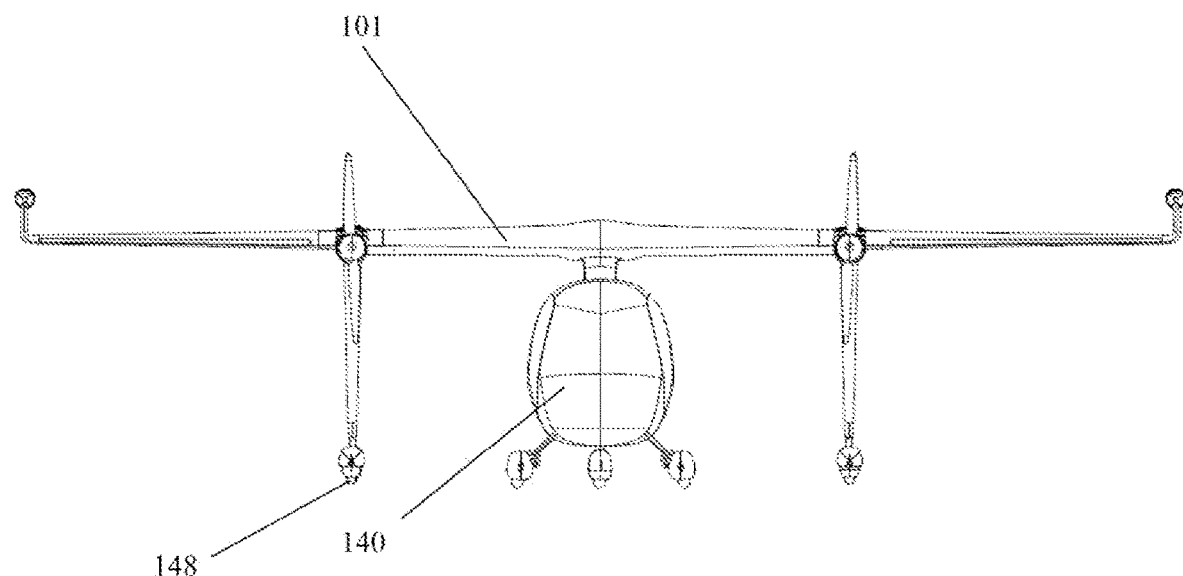
FIG. 18 is a rear view of one embodiment of a UAV system according to another aspect of the embodiment.
Figure 19:
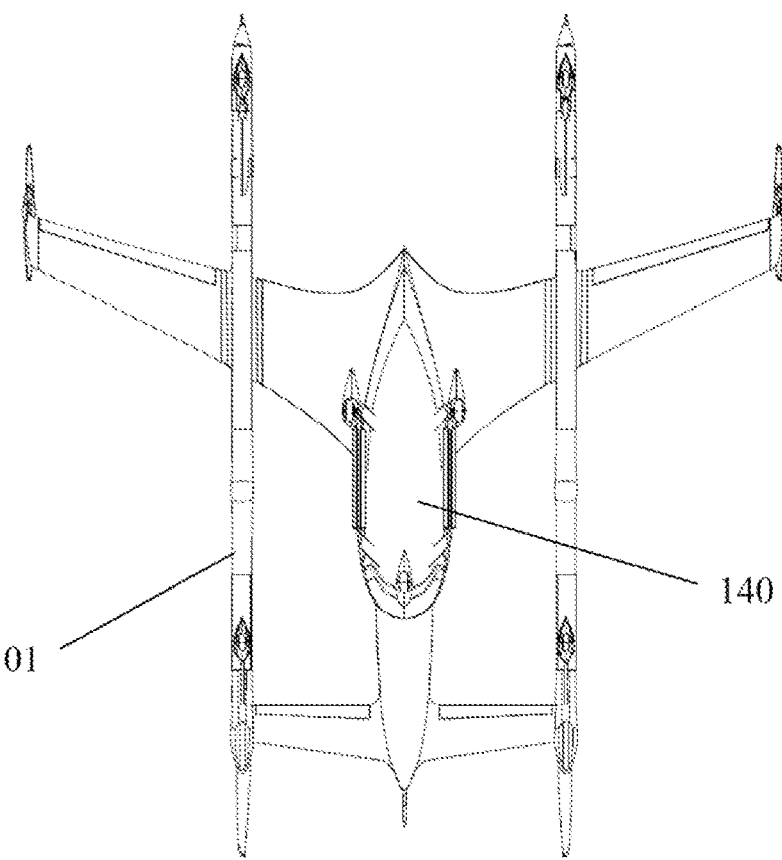
FIG. 19 is a bottom view of one embodiment of a UAV system according to another aspect of the embodiment.
Figure 20:
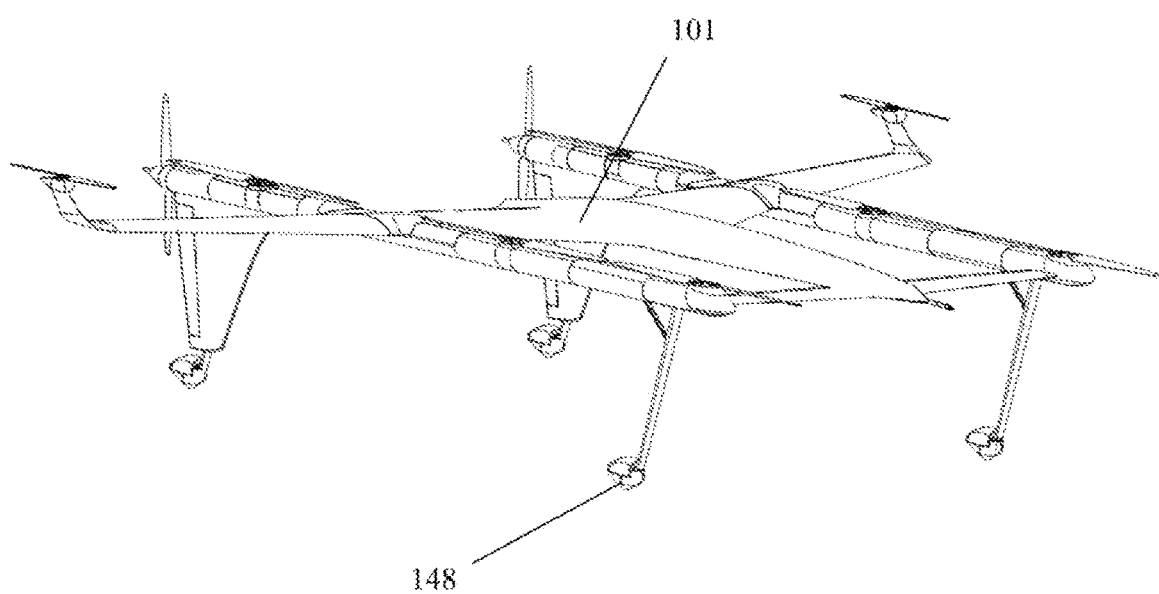
FIG. 20 is a perspective view of another embodiment of a flight platform according to another aspect of the embodiment.
Figure 21:
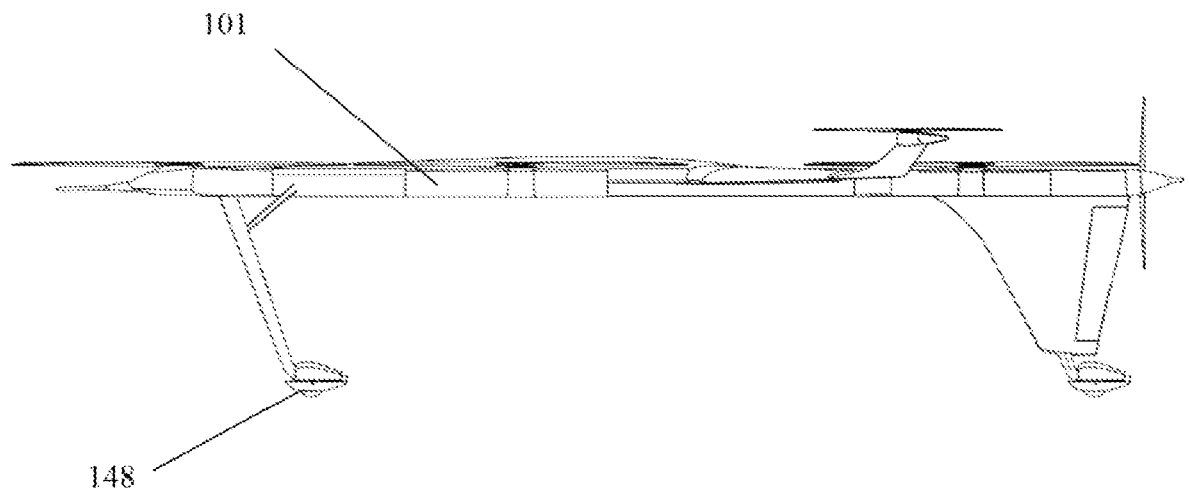
FIG. 21 is a side view of another embodiment of a flight platform according to another aspect of the embodiment.
Figure 22:
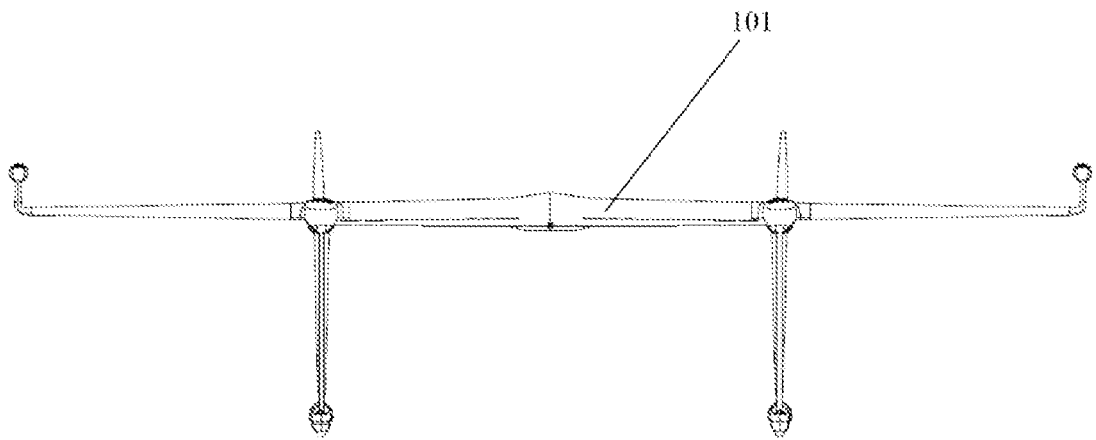
FIG. 22 is a front view of another embodiment of a flight platform according to another aspect of the embodiment.
Figure 23:
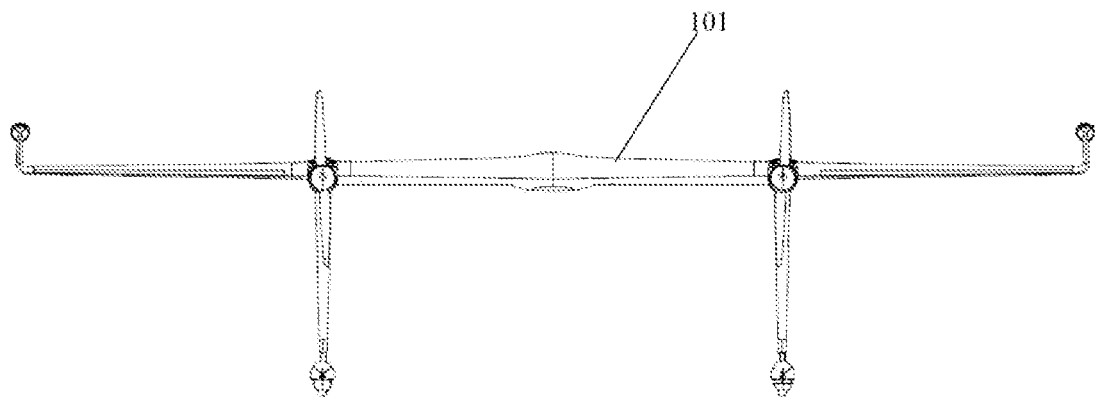
FIG. 23 is a rear view of another embodiment of a flight platform according to another aspect of the embodiment.
Figure 24:
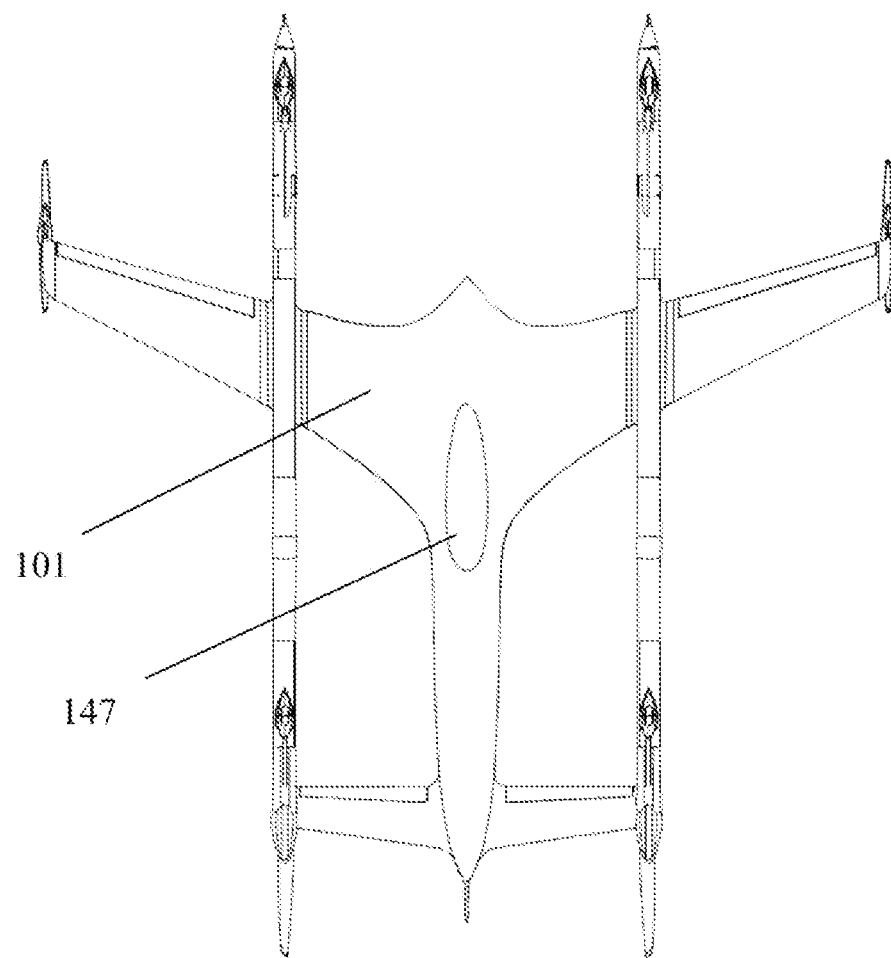
FIG. 24 is a bottom view of another embodiment of a flight platform according to another aspect of the embodiment.
Figure 25:
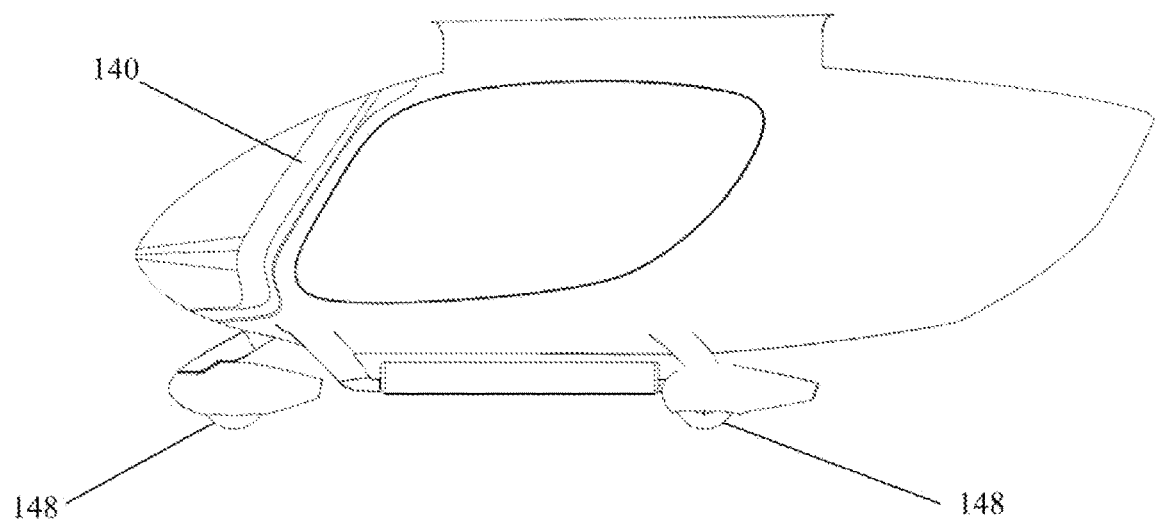
FIG. 25 is a side view of another embodiment of a passenger cabin according to another aspect of the embodiment.
Figure 26:
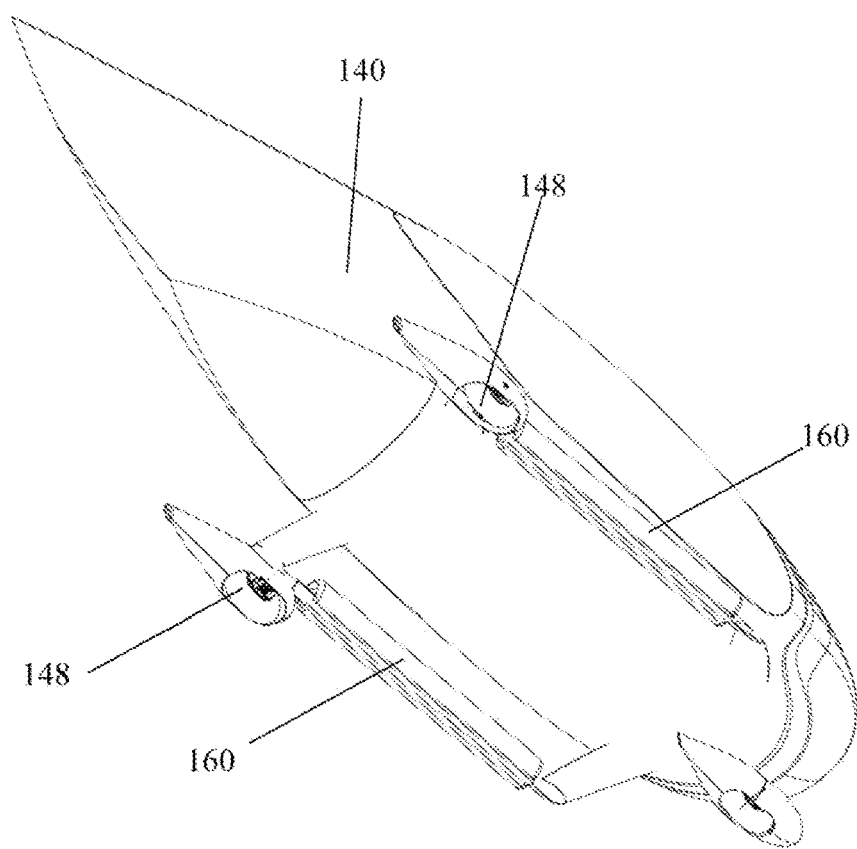
FIG. 26 is a bottom perspective view of another embodiment of a passenger cabin according to another aspect of the embodiment.
Figure 27:
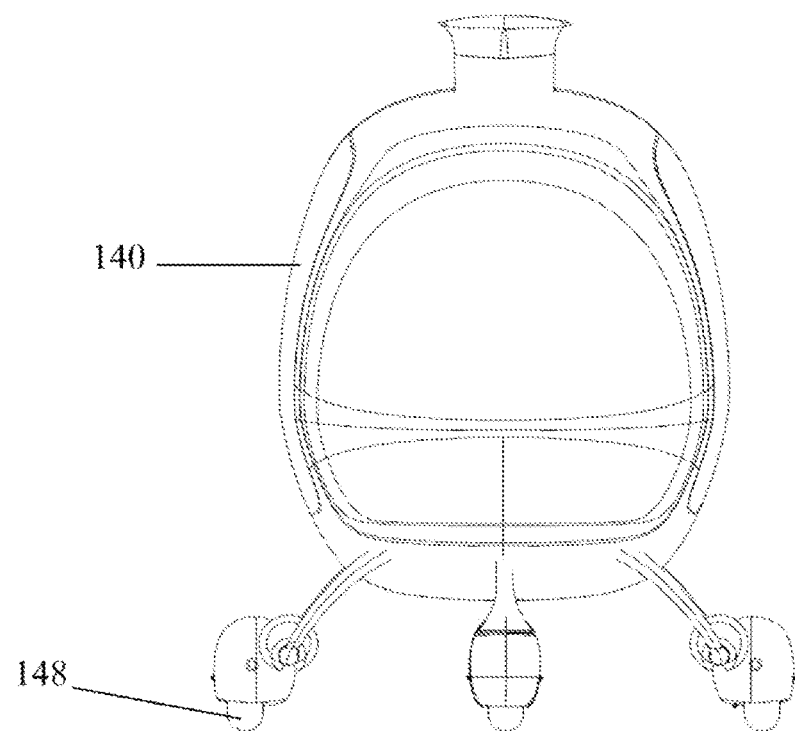
FIG. 27 is a front view of another embodiment of a passenger cabin according to another aspect of the embodiment.
Figure 28:
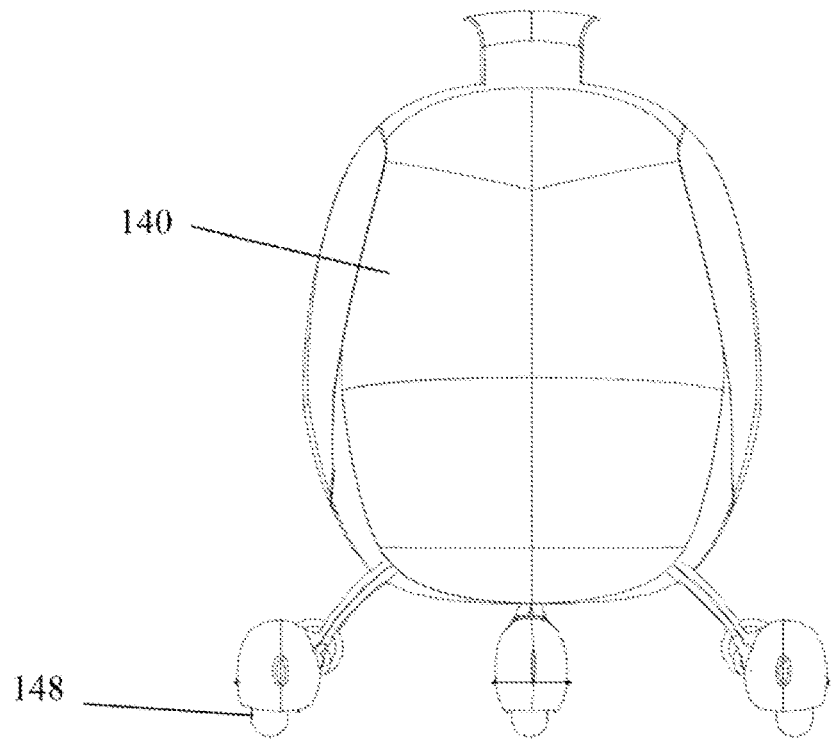
FIG. 28 is a rear view of another embodiment of a passenger cabin according to another aspect of the embodiment.
Figure 29:
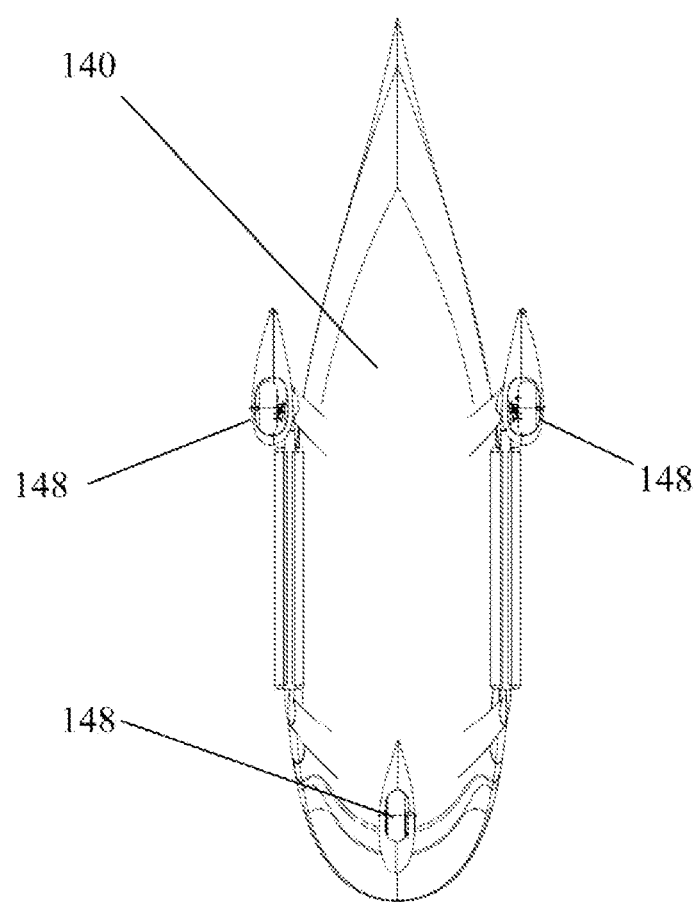
FIG. 29 is a bottom view of another embodiment of a passenger cabin according to another aspect of the embodiment.
Figure 30:
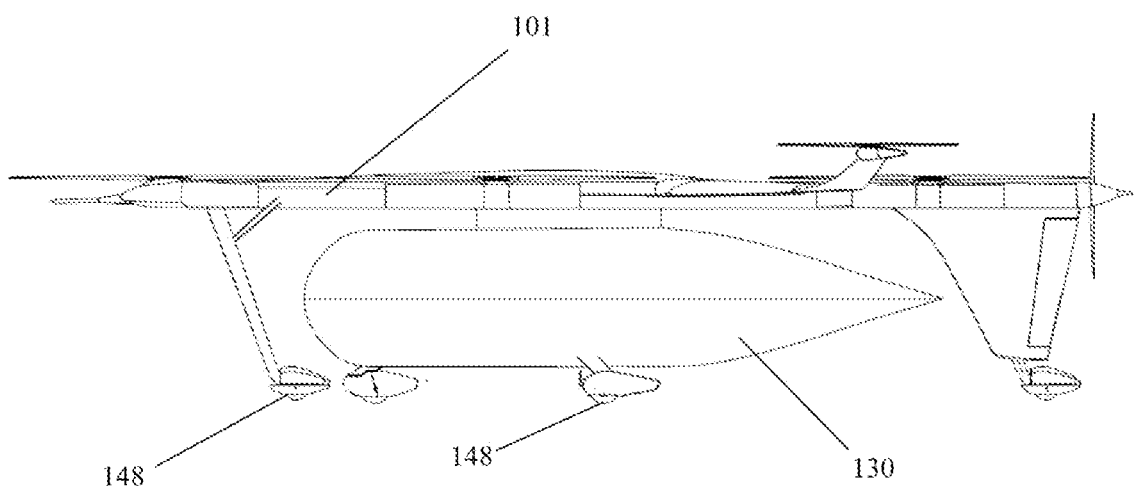
FIG. 30 is a side view of another embodiment of a flight platform attached to a cargo hold according to another aspect of the embodiment.
Figure 31:
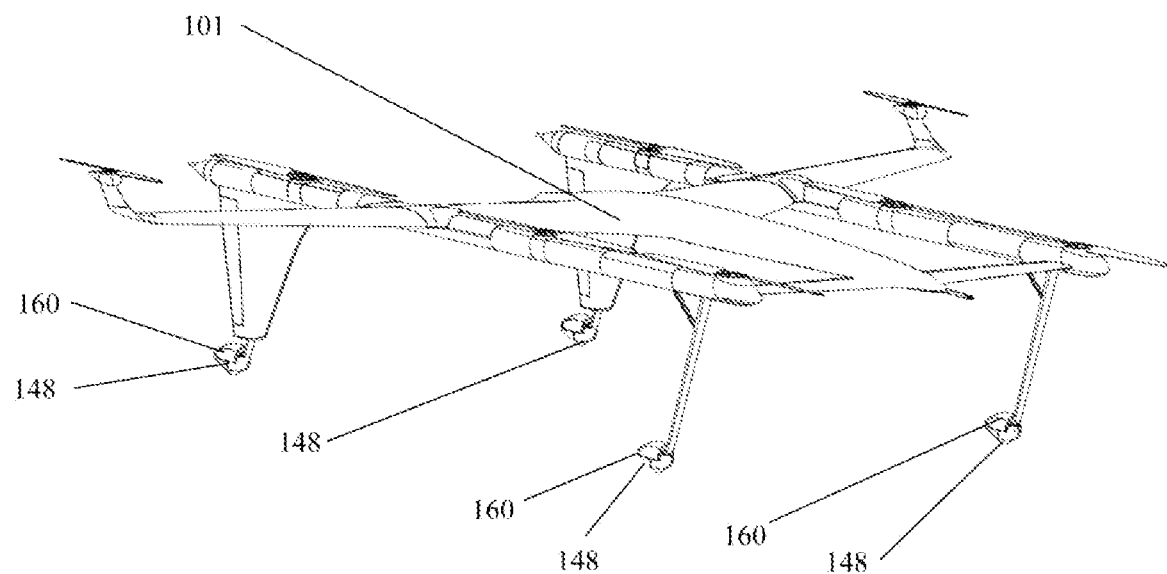
FIG. 31 is a perspective view of another embodiment of a flight platform without a propulsion propeller according to another aspect of the embodiment.
Figure 32:
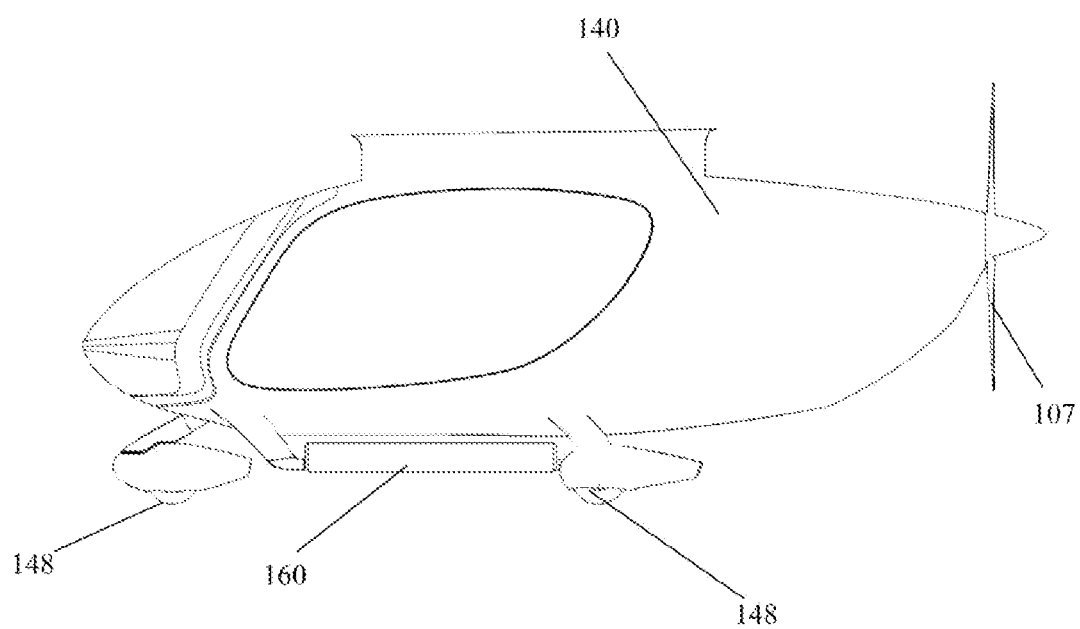
FIG. 32 is a side view of another embodiment of a passenger cabin having a propulsion propeller according to another aspect of the embodiment.
Figure 33:
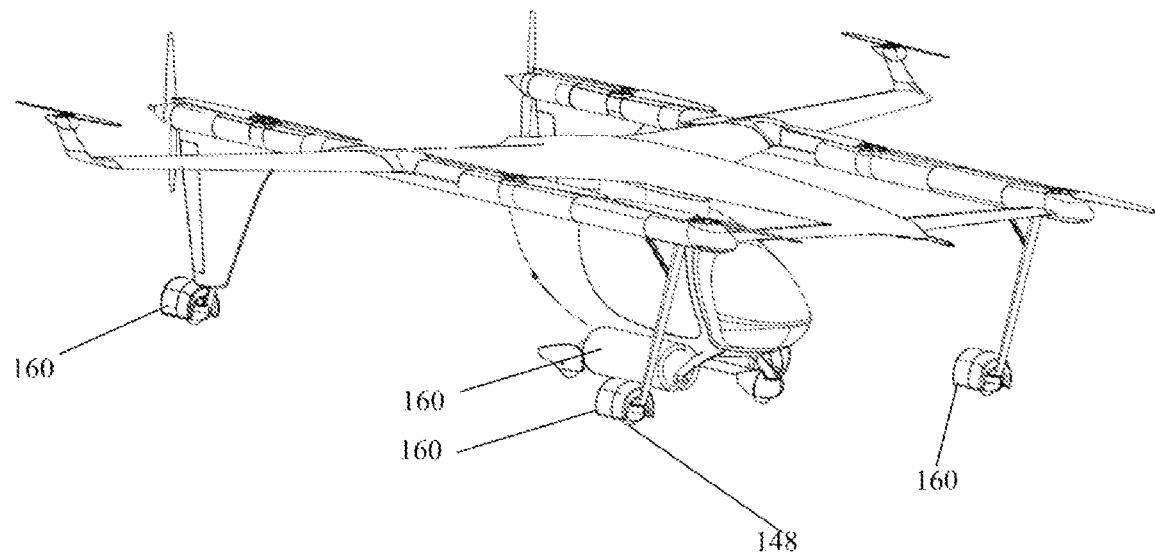
FIG. 33 is a perspective view of another embodiment of a flying UAV system wherein six floating devices are inflated.
Figure 34:
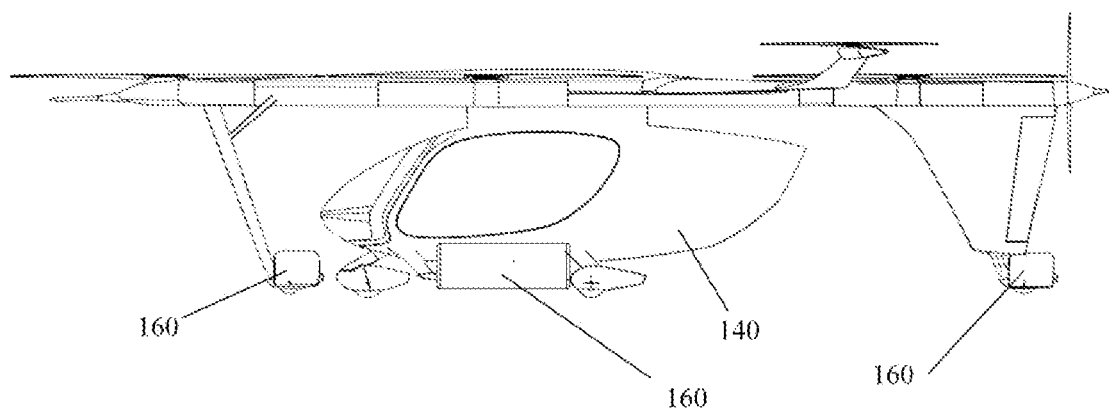
FIG. 34 is a side view of the flying UAV of FIG. 33.
Figure 35:
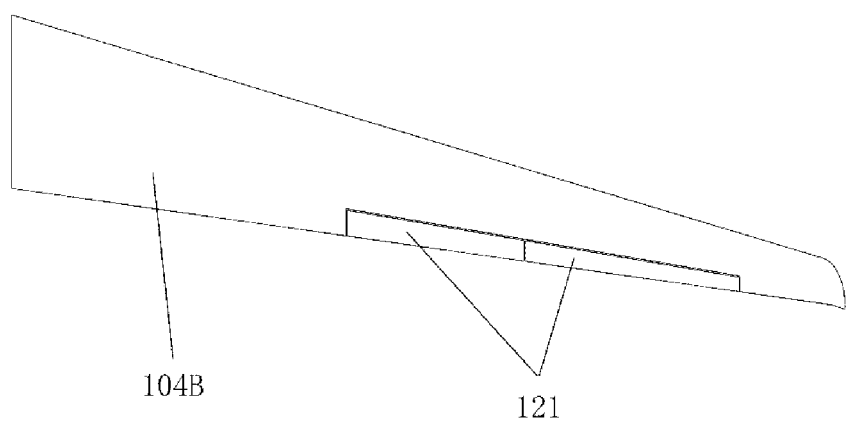
FIG. 35 is a diagram showing the configuration of an aileron of a UAV.

FIG. 1a is a top perspective view of an embodiment of a VTOL UAV system with a cabin and a water propulsion system according to one aspect of the embodiment; FIG. 1b is a partially enlarged view of the UAV system of FIG. 1a; FIG. 1c is a top perspective view of an embodiment of a VTOL UAV system with a flight platform and a cabin according to one aspect of the embodiment; FIG. 2 is a top rear perspective view of the UAV system of FIG. 1c; FIG. 3 is a side view of the UAV system of FIG. 1c; FIG. 4 is a top perspective view of another embodiment of a VTOL UAV system with a flight platform and a detachable attached cabin according to one aspect of the embodiment; FIG. 5 is a top view of the UAV system of FIG. 4 according to one aspect of the embodiment; FIG. 6 is a front view of the UAV system of FIG. 4 according to one aspect of the embodiment; FIG. 7 is a top perspective view of the embodiment of a VTOL UAV system with a flight platform and a detachable attached cabin according to one aspect of the embodiment; FIG. 8 is a front view of the UAV system of FIG. 7 according to one aspect of the embodiment; FIG. 9 is a rear perspective view of the UAV system of FIG. 7 according to one aspect of the embodiment; FIG. 10 is a side perspective view of the UAV system of FIG. 7 according to one aspect of the embodiment, wherein the cabin is separated from the flight platform and parked on the ground; FIG. 11 is a rear perspective view of the embodiment of FIG. 7 according to one aspect of the embodiment; FIG. 12 is a rear perspective view of another embodiment according to one aspect of the disclosure; FIG. 13 is a side bottom perspective view of another embodiment of a UAV system according to one aspect of the embodiment; FIG. 14 is a perspective view of an embodiment of a UAV system according to another aspect of the embodiment; FIG. 15 is a close-up view of the surrounding area in FIG. 14 according to another aspect of the embodiment; FIG. 16 is a side view of one embodiment of a UAV system according to another aspect of the embodiment; FIG. 17 is a front view of one embodiment of a UAV system according to another aspect of the embodiment; FIG. 18 is a rear view of one embodiment of a UAV system according to another aspect of the embodiment; FIG. 19 is a bottom view of one embodiment of a UAV system according to another aspect of the embodiment; FIG. 20 is a perspective view of another embodiment of a flight platform according to another aspect of the embodiment; FIG. 21 is a side view of another embodiment of a flight platform according to another aspect of the embodiment; FIG. 22 is a front view of another embodiment of a flight platform according to another aspect of the embodiment; FIG. 23 is a rear view of another embodiment of a flight platform according to another aspect of the embodiment; FIG. 24 is a bottom view of another embodiment of a flight platform according to another aspect of the embodiment; FIG. 25 is a side view of another embodiment of a passenger cabin according to another aspect of the embodiment; FIG. 26 is a bottom perspective view of another embodiment of a passenger cabin according to another aspect of the embodiment; FIG. 27 is a front view of another embodiment of a passenger cabin according to another aspect of the embodiment; FIG. 28 is a rear view of another embodiment of a passenger cabin according to another aspect of the embodiment; FIG. 29 is a bottom view of another embodiment of a passenger cabin according to another aspect of the embodiment; FIG. 30 is a side view of another embodiment of a flight platform attached to a cargo hold according to another aspect of the embodiment; FIG. 31 is a perspective view of another embodiment of a flight platform without a propulsion propeller according to another aspect of the embodiment; FIG. 32 is a side view of another embodiment of a passenger cabin having a propulsion propeller according to another aspect of the embodiment; FIG. 33 is a perspective view of another embodiment of a flying UAV system wherein six floating devices are inflated; FIG. 34 is a side view of the flying UAV of FIG. 33; FIG. 35 is a diagram showing the configuration of an aileron of a UAV.

FIG. 1a is a top perspective view of an embodiment of a VTOL UAV system with a cabin and a water propulsion system according to one aspect of the embodiment. FIG. 1b is a partially enlarged view of the UAV system of FIG. 1a. The UAV 100 comprises at least a plurality of lift propellers 108A, 108B, 108C, 108D, 108E and 108F; cabins 130 and 140 engaged with a plurality of lift propellers 108A, 108B, 108C, 108D, 108E and 108F; a water propulsion system 170 engaged with cabins 130 and 140 to push the cabins 130 and 140 in a forward direction when the cabins 130 and 140 are at least partially immersed in water; at least one water inlet 190 engaged with the water propulsion system; among them, the cabin is cargo cabin 130 or passenger cabin 140.

The UAV provided by the disclosure can realize VTOL in the water area and fly, drive and navigate freely in all areas.

FIG. 1c generally depicts an embodiment of a VTOL UAV 100 with a front wing configuration. The UAV shown in FIGS. 1a and 1c have partially the same structural configuration. The component characteristics of the UAV shown in the drawings may be combined freely, and the drawings are only exemplary.

The UAV 100 of FIG. 1c may have two main wings 104A, 104B and two front wings 105A, 105B. Two main wings 104A, 104B and two front wings 105A, 105B may be attached to the main body 102, wherein the main body may be positioned along the central longitudinal line of the UAV 100. There may also be a left linear support 103A arranged parallel to the main body 102, and the left main wing 104A may be connected to the left front wing 105A. Similarly, there may also be a right linear support 103B arranged parallel to the main body 102, and the right main wing 104B may be connected to the right front wing 105B. Among them, the front wing of the UAV mainly controls the flight attitude of the UAV during flight, such as controlling the pitch of the UAV. As the largest wing on both sides of the fuselage, the main wing of the UAV is usually used to generate lift to support the UAV flying in the air, and also plays a certain role in stabilization and control.

In another embodiment, the UAV 100 is not configured with a front wing. In contrast, the UAV 100 may have two main wings and two ailerons, all of which are joined together to form a flight platform.

In one embodiment, as shown in FIG. 35, the aileron 121 of the UAV may be arranged on the rear side of the main wing 104B, and there may be at least one aileron, preferably two, in sheet structure, which can move up and down to control the roll of the UAV.

The left and right linear supports 103A and 103B are expected to improve the structural integrity of the UAV 100. In other embodiments, the left and right linear supports 103A and 103B may accommodate drive motors (not shown) driving each of lift propellers 108A, 108B, 108C, 108D, 108E and 108F. Therefore, the left and right linear supports 103A and 103B may be used to fix the lift propellers and reduce the use of UAV components. While simplifying the structural components of the UAV, the left and right linear supports 103A and 103B can also improve the overall strength of the UAV because they are engaged with two front wings and two main wings. As will be disclosed later, the left and right linear supports 103A and 103B may also accommodate folding legs 111, each folding leg retractable into the left and right linear supports 103A and 103B.

In one embodiment, the left and right linear supports 103A and 103B are attached to the distal ends of the left and right front wings 105A and 105B, respectively. In another embodiment, the left and right linear supports 103A and 103B extend beyond the front wings 105A and 105B.

In one embodiment, the left and right linear supports 103A and 103B are attached near the middle portions of the left and right main wings 104A and 104B, respectively. In another embodiment, the left and right linear supports 103A and 103B extend in a rearward direction beyond the main wings 104A and 104B.

The left linear support 103A is expected to be relatively narrow in diameter and may have a plurality of lift propellers 108A, 108B and 108C arranged on the top side, bottom side, or both of the left linear support 103A. These lift propellers 108A, 108B and 108C may be driven by a low profile electric motor arranged in the hollow interior of the left linear support 103A. In the embodiment shown in FIG. 1c, the lift propellers 108A, 108B and 108C are only arranged on the top side of the left linear support 103A. It should be noted that the number of lift propellers shown in the figure is only for illustrative purposes. The disclosure does not limit the number. In practice, the number of lift propellers may be increased or decreased according to demand. Similarly, the right linear support 103B is expected to be relatively narrow in diameter and may have a plurality of lift propellers 108D, 108E and 108F arranged on the top side, bottom side or both of the right linear support 103B. These lift propellers 108D, 108E and 108F may be driven by a low profile electric motor arranged in the hollow interior of the right linear support. In the embodiment shown in FIG. 1c, the lift propellers 108D, 108E and 108F are only arranged on the top side of the right linear support 103B. It should be noted that the number of lift propellers shown in the figure is only for illustrative purposes. The disclosure does not limit the number. In practice, lift propellers may be increased or decreased according to demand.

In one embodiment, the UAV of FIG. 1a may include a left dorsal fin 201A and a right dorsal fin 201B, wherein the left dorsal fin 201A is arranged between any two of a plurality of lift propellers 108A, 108B and 108C on the left linear support 103A, and the right dorsal fin is arranged between any two of a plurality of lift propellers 108D, 108E and 108F on the right linear support 103B. Each of the left dorsal fin 201A and the right dorsal fin 201B has additional lift propellers 211A and 211B arranged thereon. The additional lift propeller arranged on each of the left and right dorsal fins may be arranged on the top ends of the left and right dorsal fins, respectively, the base of each of the left and right dorsal fins may at least partially overlap the left and right main wings, respectively, and each of the left and right dorsal fins has a backward inclined plane. The additional lift propeller arranged on each of the left dorsal fin and the right dorsal fin has a rotation coverage area, which partially overlaps the rotation coverage area of the lift propeller arranged immediately behind each dorsal fin and arranged on the corresponding left linear support and right linear support.

In one embodiment, the UAV 100 may have at least one propulsion propeller 107 to push the UAV 100 in a forward direction. In one embodiment shown in FIG. 1c, there may be two propulsion propellers 107A and 107B. The two propulsion propellers 107A and 107B may be arranged on the rear and distal ends of the linear supports 103A and 103B, respectively.

Alternatively, the manned cabin 140 may be installed below the VTOL UAV 100, the water propeller 180 is installed at the rear of the cabin 140 as a propeller, and the landing gear electric wheel is installed under the landing gear of the cabin 140.

In one embodiment, the water propulsion system 170 may comprise a motor (not shown) and a water propeller 180. The motor is used to provide power for the water propeller 180, thereby realizing the VTOL of the UAV in the water area.

In one possible implementation, the water propulsion system 170 also includes a cylinder, which is fixedly connected with the cabin. For example, the cylinder and the cabin may be made into one piece. The cylinder is provided with an open end and a blocking end, the axis of the cylinder is parallel to the longitudinal axis of the cabin, and the open end of the cylinder faces the rear of the UAV 100, that is, the cylinder is arranged horizontally and the open end of the cylinder faces the right. The water inlet 190 is positioned on the side wall of the cylinder so that water can flow into the cylinder from the water inlet 190. The motor is positioned inside the cylinder, and the body of the motor is fixedly connected with the inner wall of the cylinder. For example, the motor and the cylinder may be connected by fasteners such as screws.

Figure 36:
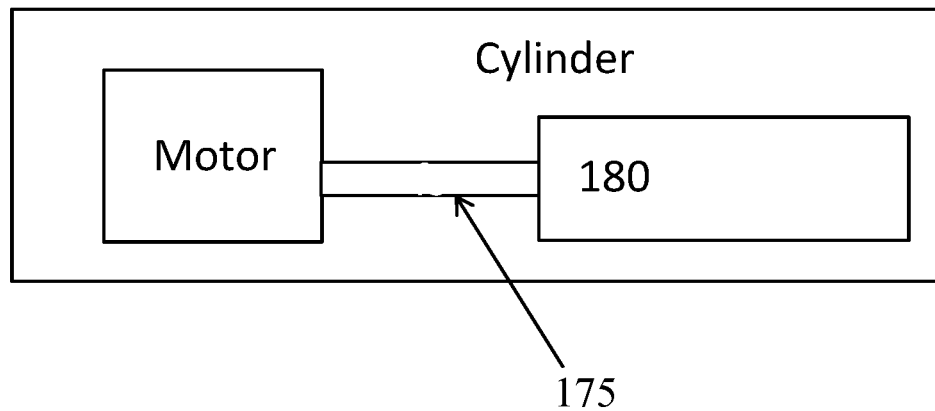
FIG. 36 is a graphical illustration of the physical relationship between the motor, the cylinder, and the water propeller.

FIG. 1b shows that the water propeller 180 is positioned inside the cylinder and close to the right end of the cylinder, that is, the open end. The water propeller 180 is driven and connected with an output shaft 175 (see FIG. 36) of the electric motor, so that when the output shaft 175 of the electric motor rotates, the water will flow in from the water inlet 190 of the cylinder and flow out from the open end of the cylinder. The left thrust generated in the process of water flow pushes the UAV 100 to navigate in the water area. For example, those skilled in the art may use the propeller as the water propeller 180 to enable water to flow from the water inlet 190 of the cylinder and out from the open end of the cylinder through the rotation of the propeller.

In one embodiment, the motor of the water propulsion system 170 may be an electric motor. The electric motor is selected as the motor of the water propulsion system 170 because of its characteristics of low noise, long endurance and easy maintenance.

In one embodiment, the UAV 100 may also include a rudder 176 engaged with the water propulsion system 170, through which the travel direction can be changed when the cabin is partially immersed in water. By adding a rudder 176 on the UAV, its travel direction can be controlled when the UAV travels in the water, thereby helping flexibly expand the movement range of the UAV 100.

Figure 37:
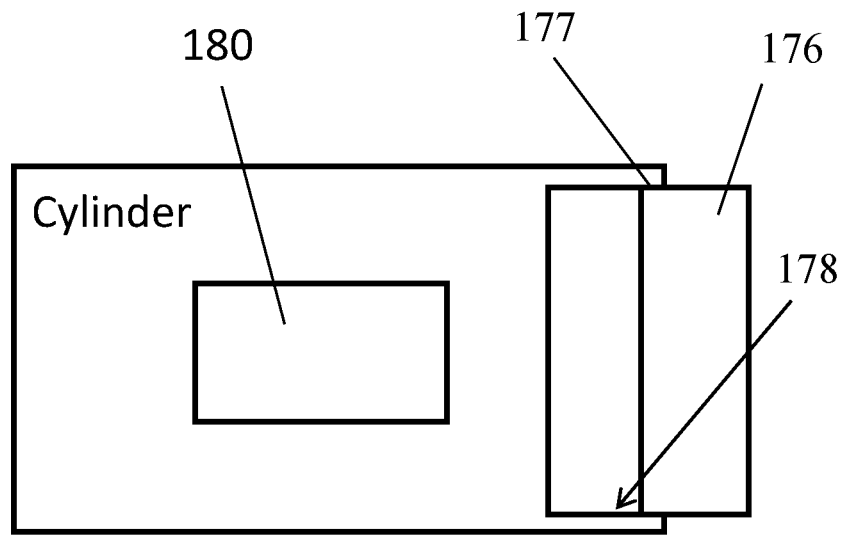
FIG. 37 is a graphical illustration of the physical relationship between the rudder, the cylinder, and the water propeller.

For example, in FIG. 37, the rudder 176 has a vertically arranged sheet structure, and the top and bottom ends of the sheet structure are hinged with the two parts opposite to the inner wall 178 of the cylinder, respectively. The rudder 176 is positioned downstream of the water propeller 180 and can rotate around the hinge point 177 with the cylinder. When the water propeller 180 drives the water to move from the surface of the rudder 176, it is possible to change the travel direction of the UAV 100 in the water area by changing the flow direction according to the rotation position of the rudder 176.

In one embodiment, a plurality of lift propellers 108A, 108B, 108C, 108D, 108E and 108F may be arranged on the flight platform 101, and the cabins 130 and 140 are detachably attached to the bottom surface of the flight platform 101. Through the above setting method, the structure of the UAV may be flexibly adjusted. According to the actual situation, the cabin may be installed when necessary and disassembled when unnecessary in order to flexibly use the UAV in response to different needs and improve its adaptability.

In one embodiment, the UAV 100 may also include a pair of main wings 104A and 104B engaged with the flight platform 101. The main wings engaged with the flight platform allows for free flight of the UAV.

In one embodiment, the UAV 100 may also include a pair of parallel linear supports 103A and 103B engaged with a pair of main wings 104A and 104B. Further engagement with linear supports on the main wing may improve the flight stability of the UAV.

In one embodiment, a plurality of lift propellers 108a, 108b, 108c, 108D, 108e, 108f may be arranged on a pair of parallel linear supports 103a and 103b. Multiple lift propellers can provide upward or downward power for the UAV, so as to ensure that the UAV can move up and down in the vertical direction.

In one embodiment, the UAV 100 may also include a floating device 160 engaged with the cabins 130 and 140 which allows the cabins 130 and 140 to float on the water; wherein, when the cabins 130 and 140 are separated from the flight platform 101, the cabins 130 and 140 can navigate in the water. In one embodiment, the floating device 160 may be kept in the deflated state and expand only when certain conditions trigger inflation. For example, the floating device 160 may be automatically inflated during an emergency landing; it maybe inflated automatically when landing on water; when any landing gear fails in some aspect, it maybe inflated. Setting the floating device may allow the cabin to float on the water so that the buoyancy of water can drive the cabin, thereby reducing the burden of the UAV and saving power consumption.

In one embodiment, the UAV 100 may also include the first energy storage unit arranged in the cabin, which is configured to supply energy to the water propulsion system 170. The energy storage unit maybe arranged to supply energy to the water propulsion system so as to guarantee the free navigation of the UAV in the water.

In one embodiment, the cabins 130 and 140 or the flight platform 101 may have a disengagement mechanism which allows for selectively separating the cabins 130 and 140 from the flight platform 101 during operation. Such mechanism may allow for the separation of the cabins according to the needs so as to further improve the adaptability of the UAV to different flight environments. The engagement and disengagement between the flight platform 101 and the cabin 140 may be performed autonomously by a computer and/or other sensors and computing devices (without simultaneous user intervention). Alternatively or optionally, the user may actively control and guide the engagement and disengagement between the flight platform 101 and the cabin 140.

In one embodiment, the UAV 100 may also include a user control interface inside the cabins 130 and 140 for passengers to manually control the water propulsion system 170, wherein the cabin is the passenger cabin 140. The user control interface as arranged may realize the interaction between passengers and the UAV in a friendly way, so as to control the heading of the UAV and improve the user experience.

In one embodiment, the UAV 100 may also include the second energy storage unit arranged in the flight platform, and the flight platform 101 is arranged to fly without being attached to the cabins 130 and 140. The second energy storage unit arranged for the flight platform may be used as the supplementary energy to provide power for the flight platform so as to improve the reliability and safety of the flight platform.

In one embodiment, the cabins 130 and 140 may be provided with at least one electric wheel 148 which is configured to move the cabins 130 and 140 on the ground. The electric wheel may be arranged easily for the cabin to improve the mobility of the cabin.

In one embodiment, the flight platform 101 may be provided with at least one electric wheel 148 which is arranged to move the flight platform 101 on the ground without being attached to the cabins 130 and 140. Such arrangement may further the mobility of the flight platform and expand the activity range of the UAV, allowing it to be applied in more scenarios.

The VTOL UAV provided by the disclosure may use a lift propeller to realize vertical takeoff and landing; the land driving ability may be realized through the landing gear electric wheel under the fuselage; a water propeller is installed at the rear of the cabin to offer it the capability of driving in the water.

The VTOL UAV provided by the disclosure has the advantages of compact design, high integration, light weight and simple structure so that it may realize the triphibian operation in water, land and air with one model. It is less affected by site factors such as terrain, and its environmental adaptability is better than the model with single function or two functions. The above components and corresponding functions may be used in a separate application environment or a composite application environment. The whole UAV adopts modular design, which allows for removing a module at any time to realize the takeoff and landing function in the corresponding region.

When the lift propeller of the VTOL UAV provided by the disclosure is a pneumatic one, the UAV can complete the vertical takeoff and landing and fly in the sky. When it reaches the predetermined flight height, it will be switched to the fixed wing mode to push the propeller pneumatically, and the UAV will begin to fly; When the UAV lands on the water surface or sea water, the water propeller at the rear of the manned passenger cabin will start to propel the UAV to navigate in the water; when the UAV lands in the land area, the electric wheel under the landing gear of the manned passenger cabin will start, in which case the UAV can drive on land. Therefore, the UAV with VTOL function provided by the disclosure can achieve the purpose of the UAV navigation in the water area through a water propeller arranged at the rear of the manned cargo hold, complete the VTOL in the water area through the VTOL system and achieve the purpose of vertical takeoff and landing in the water area, and achieve the function of water-land-air triphibian composite application through the water propeller installed at the rear of the manned passenger cabin and the landing gear electric taxi wheel installed in the manned passenger cabin. Among them, two areas such as water-land, road-air, and water-air may also be freely changed to realize the ability of flying, driving and navigation in all area. The water propeller installed at the rear of the manned passenger cabin may achieve the purpose of UAV navigation in water area.

In another embodiment, such as the embodiment shown in FIG. 31, the flight platform 101 may not be provided with the propulsion propeller. In such an embodiment, the flight platform 101 may be attached to a passenger cabin or cargo hold on which a propulsion propeller is provided. FIG. 32 shows an embodiment of a passenger cabin with a propulsion propeller arranged at its rear end. When the passenger cabin is attached to the flight platform 101 of FIG. 31, the propulsion propeller will be push forward the flight platform 101.

Two vertical stabilizers 106A and 106B may be arranged near the rear end of each of linear supports 103A and 103B, respectively. Although they are shown pointing downward, there may also be embodiments in which they point upward.

In another embodiment, each of main wings 104A and 104B may have wingtip lift propellers 109A and 109B, respectively, arranged at the distal end thereof. This can be achieved by providing wingtip vertical stabilizers 110A and 110B at the distal ends of the main wings 104A and 104B, respectively, and having lift propellers 109A and 109B arranged at the upper tip of each of wingtip vertical stabilizers 110A and 110B. These wingtip lift propellers 109A and 109B may be relatively smaller than the lift propellers provided on the linear supports 103A and 103B.

These wingtip lift propellers 109A and 109B may be used to control the rolling of the UAV 100 in an effective and efficient manner. These wingtip lift propellers 109A and 109B are positioned at the farthest position away from the central axis of the UAV 100, which is effective in adjusting the rolling of the UAV 100, and it can be achieved with a diameter smaller than that of other lift propellers.

As further shown in FIG. 1c, there is a cabin 130 normally attached below the main body 102 of the UAV 100.

Now, referring to the details of FIG. 2, the UAV 100 is expected to use any type of landing gear. In one embodiment, the UAV 100 may have four single leaf springs 112A, 112B, 112C and 112D as its landing gear. The first two single leaf springs 112A and 112C are arranged on the distal ends of the folding legs 111A and 111B, respectively. During flight, the folding legs 111A and 111B may be retracted into the internal space of the left and right linear supports 103A and 103B, respectively.

The two left single leaf springs 112B and 112D at the rear are expected to be arranged at the distal ends of the bottom of the vertical stabilizers 106A and 106B, respectively.

The expected single leaf springs 112A, 112B, 112C and 112D may be made of suitable materials to provide sufficient elasticity and integrity, including natural and synthetic polymers, various metals and metal alloys, natural materials, textile fibers, and all reasonable combinations thereof. In one embodiment, carbon fibers are adopted.

Now turning to FIG. 3, it shows a cabin as cargo hold 130. The cargo hold 130 may have single leaf springs 135A, 135B, 135C and 135D as its landing gear. Alternatively, it may have other types of landing gear, such as rails, legs, and wheels.

In the intended embodiment, the cargo hold 130 may be disassembled from the rest of the UAV 100. The rest of the UAV may be referred to as flight platform 101. The flight platform 101 may fly without a cabin, and it may carry different cabins interchangeably. As will be described later, the flight platform 101 may also carry a passenger cabin.

In the example shown, all cabins 130 and 140 are carried below the flight platform 101. It is expected that the cabins 130 and 140 are loaded on the ground, and the loading process may be completed before or after the flight platform 101 is attached to the cabins 130 and 140.

FIG. 5 shows a top view of the flight platform 101. It may have a substantially flat structure and can carry a load below or above it. During high-speed flight, all six lift propellers 108A, 108B, 108C, 108D, 108E and 108F may be locked in place so that each left is parallel to the main body 102.

FIG. 5 shows an embodiment of the flight platform 101 wherein the length of the front wings 105A and 105B is not longer than half the length of each of main wings 104A and 104B.

FIG. 6 generally depicts a front view of the flight platform 101 with a detachably attached cargo hold 130. Whether it is cargo hold 130, passenger cabin 140 or any other type of load, it is particularly expected that there may be an energy storage unit 150 provided in the main body 102 of the flight platform. The stored energy may be used to power other components of the flight platform, such as lift propellers 108A, 108B, 108C and 108D and propulsion propellers 107A and 107B. The stored energy may be electricity, and the storage unit is a battery. In another embodiment, the energy storage 150 may be used to power accessories in cabins 130 and 140.

The battery 150 may also be provided in other parts of the flight platform 101, such as in linear supports 103A and 103B.

Alternatively or optionally, there may be an energy storage unit 155 provided in the cabins 130 and 140. The energy stored in the storage unit 155 may be used to power the lift propellers 108A, 108B, 108C and 108D and the propulsion propellers 107A and 107B. The stored energy may be electricity, and the storage unit is a battery. By having an energy storage unit 155 in the cabins 130 and 140, the flight platform 101 will have a supplementary energy source whenever the flight platform 101 carries new cabins 130 and 140. The flight platform 101 itself may be an emergency energy storage or a small capacity battery 150 to provide power to the flight platform 101 in a short time when the flight platform 101 flies without cabins 130 and 140. In one embodiment, the main power supply of the flight platform 101 comes from the battery 150 positioned in the cabins 130 and 140. In this way, when the old cabins 130 and 140 are replaced with the new cabins 130 and 140 in the flight platform 101, the flight platform 101 or the whole VTOL UAV system 100 will have a fully charged energy source. This is a useful method, and there is no need for VTOL UAV to charge itself. In a preferred embodiment, the flight platform 101 can work/fly continuously for hours or even days, pick up the cargo hold/passenger cabin, and unload the cargo hold/passenger cabin without stopping to charge its battery.

Now, referring to the details of FIG. 7, a passenger cabin 150 is provided. The passenger cabin 150 may use any type of landing gear, such as rigid legs 145A, 145B, 145C, and 145D as shown in the figure.

FIG. 10 generally depicts an aspect of the disclosure, wherein the cabin (whether cargo hold or passenger cabin) is detachable. Here, the cabin 140 may be selectively separated from the flight platform 101. The engagement and disengagement between the flight platform 101 and the cabin 140 may be performed autonomously by a computer and/or other sensors and computing devices (without simultaneous user intervention). Alternatively or optionally, the user may actively control and guide the engagement and disengagement between the flight platform 101 and the cabin 140.

As ordinary people skilled in the art will recognize, various types of engagement mechanisms 147 may be used to secure the cabin 140 to the flight platform 101. For example, the engagement mechanism may be mechanical latch, magnetic latch, track and groove, or any combination of known engagement methods.

It is important to understand that, in addition to having two propulsion propellers 107A and 107B (as shown in FIG. 11), alternatively or optionally, there may be a central propulsion propeller 117 connected to the rear end of the body 102 (as shown in FIG. 12). As shown in FIG. 12, the central push propeller 117 is engaged to the rear end of the main body 102 through the vertical expander 116. The vertical expander 116 may be any structure of any shape to be physically engaged with the propulsion propeller 117 so that the rotation center of the propulsion propeller 117 deviates vertically from the main body 102. In another embodiment, the propulsion propeller 117 deviates vertically from the main body 102 so that the rotation center of the propulsion propeller 117 is vertically flush with the rear of the cabin 140. In another embodiment, the propulsion propeller 117 is vertically flush with the top of the cabin 140. In another embodiment, the propulsion propeller 117 is vertically flush with the middle of the cabin 140. In a further embodiment, the propulsion propeller 117 is vertically flush with the bottom of the cabin 140.

What is not shown in any figure of the embodiment is that the propulsion propellers 107A and 107B are not provided at the ends of the linear supports 103A and 103B, respectively. On the contrary, only one propulsion propeller 117 is engaged with the rear end of the main body 102.

It may be also envisaged that each of linear supports 103A and 103B may include more than three lift propellers by providing longer linear supports to accommodate more lift propellers, by using lift propellers of smaller diameter, or by arranging lift propellers on both the top and bottom sides of the linear support. FIG. 13 shows an embodiment wherein two additional lift propellers 108G and 108H are arranged at the front end of the bottom of the linear supports 103A and 103B.

Although the propulsion propellers 107A and 107B have been shown in the previous figure to be positioned at the rear distal end of the linear supports 103A and 103B, it is particularly expected that these propulsion propellers 107A and 107B may be arranged at a horizontal plane lower than the main wings 104A and 104B, such as those shown in FIG. 13. On one hand, these propulsion propellers 107A and 107B may be arranged at a level substantially equal to the cabins 130 and 140 carried by the flight platform. On the other, these propulsion propellers 107A and 107B may be arranged in the middle of the vertical stabilizers 106A and 106B. One expected reason for reducing the arrangement of propulsion propellers 107A and 107B is to minimize the head dipping effect during flight, which may be caused by the aerodynamic effect caused by cabins 130 and 140.

FIGS. 14 to 30 show an embodiment wherein the flight platform 101 or the cabins 130 and 140 or both may have an electric wheel 148 attached thereto. In the embodiment of FIG. 14, the flight platform 101 has an electric wheel 148; the cabins 130 and 140 also have electric wheels. Now referring to the embodiment of FIG. 15, a single electric wheel unit 148 may have an electric motor enclosed in the housing 149, and the electric motor may be driven by power supplied by the energy storage unit 150 provided in the cabins 130 and 140.

It is envisaged that the electric wheel 148 may move the flight platform 101 and the cabin 130 on the ground when they are parked on the ground. This allows the cabin 130 or 140 to move away from the flight platform 101 and allows the other one of cabin 130 or 140 to move itself to the flight platform 101 for engagement.

Alternatively, this may allow the flight platform 101 to move away from the cabin 130 and towards another cabin for engagement. In one embodiment, each cabin 130, 140 may have an energy storage unit 155 so that when the flight platform 101 is engaged with the new and fully charged cabins 130, 140, the flight platform 101 will basically supplement its energy source.

In some embodiments of the disclosed unmanned aircraft system, at least one floating device 160 may be provided, which is engaged with at least any of the cargo hold 130, the passenger cabin 140 and the flight platform 101. The floating device may be of a type that needs to be actuated, that is, actively inflated with gas or material when required. In other words, in this particular embodiment, the floating device 160 may remain in the deflated state and expand only when certain conditions trigger inflation. For example, the floating device 160 may automatically inflate during an emergency landing; it may inflate automatically when landing on water; when any landing gear fails in some aspect, it may be inflated.

Many known types of inflation mechanisms or airbag mechanisms may be implemented to achieve the needs and configuration of the disclosed floating device 160. The expected floating device 160 may be of a type that can be reused, re-inflated and re-deflated repeatedly. The intended floating device 160 may also be disposable only.

Alternatively or optionally, the inflation behavior may be activated by the user. For example, when the operator of the UAV system determines that the floating device 160 needs to be inflated, he or she may send a signal to start inflation.

In some embodiments, it should be noted that the floating device 160 does not need to have an electric wheel 148. In other embodiments, as shown in FIGS. 14 and 15, the floating device 160 is part of the housing of the electric wheel 148. The floating device 160 may include a plurality of air bags that can be inflated and deflated. It is easy to understand that the number of air bags is the same as that of the electric wheel 148, and a plurality of air bags are evenly arranged on the left and right sides of the cabin.

Referring to FIG. 26 as an example, the passenger cabin 140 may have an extended floating device 160 arranged on either side of the cabin 140, which may be used as a waterborne landing gear, that is, the floating device 160 includes a long strip structure that can be inflated and deflated. FIG. 26 shows that the length direction of the long strip structure is parallel to the longitudinal axis of the cabin, and there are two long strip structures arranged on the left and right sides of the cabin, respectively. In FIG. 26, these floating devices 160 are shown as deflated. FIG. 32 shows a side view of the deflated floating device 160. As shown in FIGS. 33 and 34, the floating device 160 engaged with the passenger cabin 140 is shown as inflated.

Referring to FIG. 31 as another example, the flight platform 101 may have four floating devices 160 arranged on the top of each of the four electric wheels 148. These floating devices 160 may alternatively be attached to or close to the electric wheel 148 at other positions. In FIG. 31, these floating devices 160 engaged with the electric wheel 148 are shown as deflated. FIGS. 33 and 34 show an inflated floating device 160 of the flight platform 101.

Many changes and modifications can be made by those skilled in the art without departing from the spirit and scope of the disclosed embodiments. Therefore, it must be understood that the illustrated embodiments are proposed only for the purpose of example. For example, despite the fact that the elements of the technical solution are presented below in some combination, it must be clearly understood that the embodiment includes other combinations of fewer, more or different elements, which are disclosed herein, even if such combinations are not limited initially.

Therefore, specific embodiments and applications of VTOL flight platforms with interchangeable cabins have been disclosed. However, it will be apparent to those skilled in the art that more modifications other than those already described are possible without departing from the concepts disclosed herein. Therefore, the disclosed embodiments are unrestricted. In addition, when interpreting the specifications, all terms shall be interpreted in the manner as extensive as possible that is consistent with the context. In particular, the terms "include" and "contain" should be interpreted as referring to an element, component or step in a non-exclusive manner, indicating that the referenced element, component or step may exist, or be utilized, or be combined with other elements, components or steps not explicitly referenced. Non-substantive changes in the claimed subject matter known now or expected later to be seen by those skilled in the art are clearly expected to be equivalent within the scope of the technical solution of the specifications. Therefore, obvious substitutions now or hereafter known to those of ordinary people skilled in the art are defined as being within the scope of the defined elements. Therefore, the technical solution of the specifications should be understood as including the contents specifically explained and described above, the contents that are conceptually equivalent, the contents that can be obviously replaced, and the contents that basically include the basic idea of the embodiment. In addition, in the case where the specifications involve at least one element selected from the group consisting of A, B, C . . . and N, the text should be interpreted as requiring at least one element in the group to include N, rather than A plus N, or B plus N, etc.

The invention claimed is:

1. A UAV (unmanned aerial vehicle), which is characterized by comprising:
   a plurality of lift propellers disposed on a flight platform;
   a cabin engaged with said plurality of lift propellers;
   a water propulsion system engaged with the cabin to push the cabin in a forward direction when the cabin is at least partially immersed in water;
   at least one water inlet engaged with the water propulsion system;
   wherein the water propulsion system includes a motor, a water propeller and a cylinder;

wherein the cylinder is fixedly connected to the cabin; the cylinder is provided with an open end and a blocking end; the cylinder has an axis and said axis is parallel to a longitudinal axis of the cabin; and the open end of the cylinder faces a rear end of the UAV; the water inlet is positioned on a side wall of the cylinder;

wherein the motor is positioned inside the cylinder, and a body of the motor is fixedly connected with an inner wall of the cylinder; and wherein the water propeller is positioned inside the cylinder and close to the open end of the cylinder, and the water propeller is connected with an output shaft of the motor; and wherein said cabin is detachably attached to the flight platform.

2. The UAV according to claim 1 further comprising a pair of main wings coupled to the flight platform.

3. The UAV according to claim 2, wherein the flight platform comprises a pair of parallel linear supports coupled to said pair of main wings.

4. The UAV according to claim 3, which is characterized in that said plurality of lift propellers are disposed on said pair of parallel linear supports.

5. The UAV according to claim 2 further comprising a floatation device coupled to the cabin wherein when the cabin is physically detached from the flight platform, the cabin can float on water.

6. The UAV according to claim 5, wherein the floatation device comprises an elongated strip structure capable of inflation and deflation, and having a lengthwise direction parallel to a longitudinal axis of the cabin.

7. The UAV according to claim 5, wherein the floatation device comprises a plurality of air bags capable of inflation and deflation, said plurality of air bags are evenly arranged on a left side and a right side of the cabin.

8. The UAV according to claim 5 further comprising a first energy storage unit arranged in the cabin, and is configured to supply energy to the water propulsion system.

9. The UAV according to claim 8 further comprising a second energy storage unit arranged in the flight platform, and the flight platform can fly without being attached to the cabin.

10. The UAV according to claim 9, which is characterized in that the cabin has at least one electrically-driven wheel configured to move the cabin on a ground.

11. The UAV according to claim 9, which is characterized in that the flight platform has at least one electrically-driven wheel configured to move the flight platform on a ground without being attached to the cabin.

* * * * *